US007827051B2

(12) United States Patent
Sánchez et al.

(10) Patent No.: US 7,827,051 B2
(45) Date of Patent: Nov. 2, 2010

(54) SCHEDULING WITH LAYOVERS AND LAYOVER CHARGE COMPUTATION IN TRANSPORTATION PLANNING

(75) Inventors: Javier Nicolás Sánchez, San Carlos, CA (US); Mei Yang, Albany, CA (US); Rongming Sun, Hayward, CA (US); Roy I. Peterkofsky, San Francisco, CA (US); Hema Budaraju, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1532 days.

(21) Appl. No.: 11/136,167

(22) Filed: May 23, 2005

(65) Prior Publication Data

US 2006/0265264 A1 Nov. 23, 2006

(51) Int. Cl.
*G06F 17/30* (2006.01)
(52) U.S. Cl. .................. 705/7; 705/8; 705/9; 705/10
(58) Field of Classification Search .............. 705/7, 705/8, 9, 10
See application file for complete search history.

(56) References Cited

U.S. PATENT DOCUMENTS

| | | | | |
|---|---|---|---|---|
| 5,623,413 | A * | 4/1997 | Matheson et al. ........... | 701/117 |
| 5,886,331 | A | 3/1999 | Lyons, Jr. .................. | 236/61 B |
| 6,219,653 | B1 * | 4/2001 | O'Neill et al. ............... | 705/400 |
| 6,526,341 | B1 * | 2/2003 | Bird et al. ..................... | 701/35 |
| 2002/0019759 | A1 * | 2/2002 | Arunapuram et al. .......... | 705/7 |
| 2004/0107110 | A1 | 6/2004 | Gottlieb et al. | |
| 2005/0246192 | A1 * | 11/2005 | Jauffred et al. ................. | 705/1 |

OTHER PUBLICATIONS

M2 Presswire, Manugistics: Manugistics extends industry's most comprehensive transportation management solution, M2 Communications Ltd., Dec. 17, 1997 [Proquest].*
Frizzell, P.W. and Giffin, J.W. The Split Delivery Vehicle Scheduling Problem with Time Windows and Grid Network Distances. Computers OPS Res. vol. 22 No. 6, pp. 655-667, 1995 Elsevier Science Ltd.*

(Continued)

*Primary Examiner*—Jonathan G. Sterrett
*Assistant Examiner*—Stephanie Zagarella
(74) *Attorney, Agent, or Firm*—Silicon Valley Patent Group LLP; Omkar Suryadevara

(57) ABSTRACT

A computer, for planning moves of freight automatically adds one or more layover(s) to a mission. Next, the computer determines one or more charge(s) for the layovers, using carriers' rules. Thereafter, the computer uses the charge(s) in deciding whether to include the mission in a transportation plan to be executed. In some embodiments, the computer automatically maintains, for the given mission, counts of attributes on which limits are imposed by a government or by carriers, such as driving time, on-duty time, and driving distance, and when any count exceeds a corresponding limit in the midst of a driving activity, the computer automatically divides up the current driving activity into a truncated driving activity and a remainder driving activity, separated by a layover activity. The computer also determines an estimated time of arrival, including the impact of required layovers, to reach destination(s), and whether layover(s) is/are required at the destination(s), e.g. due to consignee's receiving hours or due to congestion at consignee's dock.

20 Claims, 12 Drawing Sheets

OTHER PUBLICATIONS

Thompson, Paul and Psaraftis, Harilaos. Cyclic Algorithms for Multivehicle Routing and Scheduling Problems. Operations Research, vol. 41, No. 5, pp. 935-946, 1993 Informs, retrieved from http://www.jstor.org/stable/171656.*

Grunert, Tore and Sebastian, Hans-Jurgen. Planning Models for Long-Hault Operations of Postal and Express Shipment Companies. European Journal of Operational Research 122, pp. 289-309, 2000 Elsevier Science Ltd.*

Peeta, Srinivas and Mahmassani, Hani. Multiple User Classes Real-Time Traffic Assignment for Online Operations: A Rolling Horizon Solution Framework. Transpn. Res. C. vol. 3 No. 2, pp. 83-98, 1995 Elsevier Science Ltd.*

Peterkofsky, R. "Introducing Transportation Planning: A New Solution For You", Slide presentation, Dec. 8, 2004, pp. 34.

Oracle Corporation, Data Sheet—Oracle Transportation Planning, Sep. 2004, pp. 1-6.

Schineller, B. "Joe's Juggling Act", OR/MS Today, Dec. 1998, pp. 1-8.

Entire Prosecution History of U.S. Appl. No. 11/113,514, filed on Apr. 25, 2005 by Rongming Sun et al.

Entire Prosecution History of U.S. Appl. No. 11/136,045, filed May 23, 2005 by Roy Peterkofsky et al.

Entire Prosecution History of U.S. Appl. No. 11/097,435, filed on Apr. 1, 2005 by Rongming Sun et al.

* cited by examiner

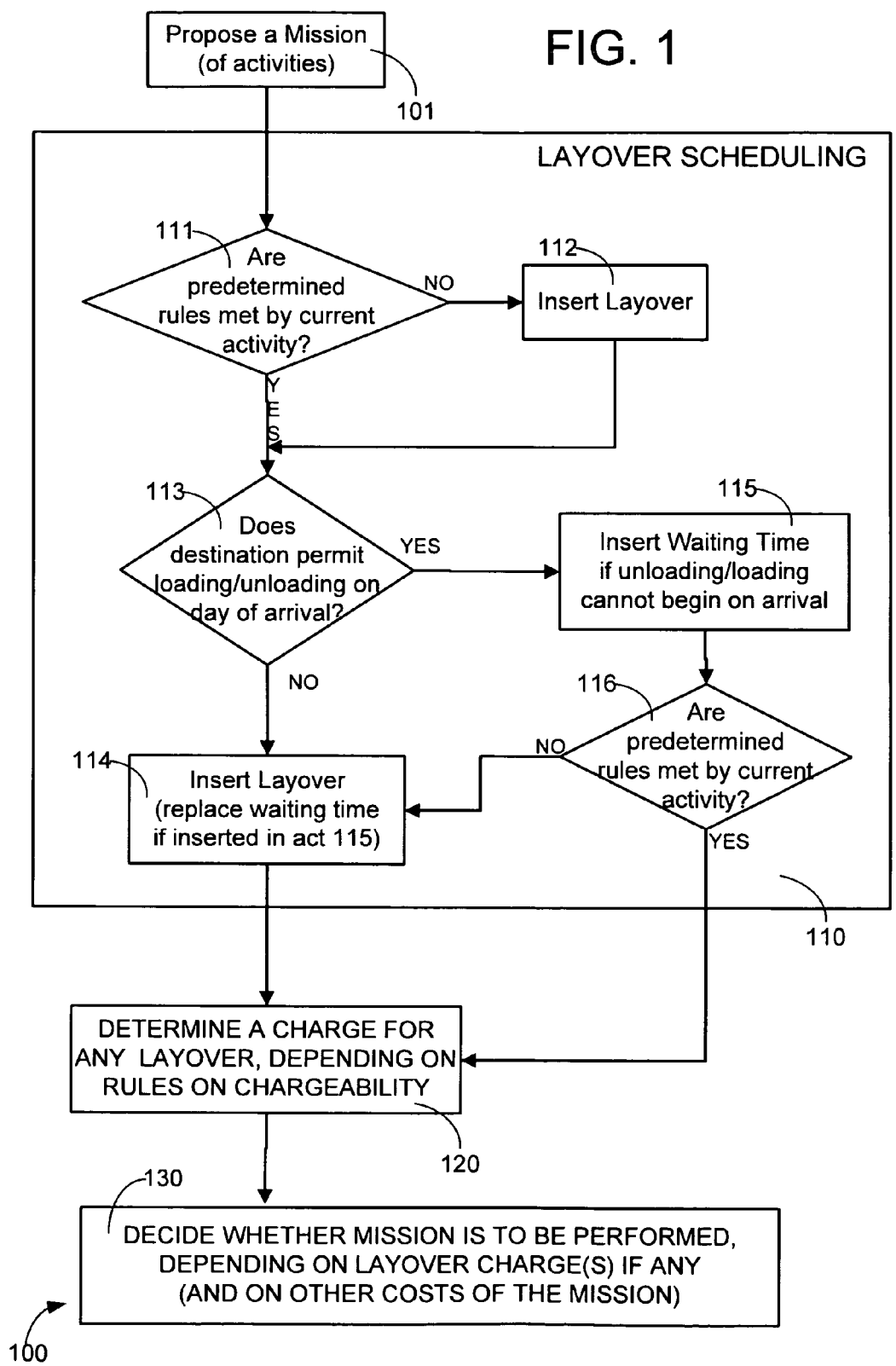

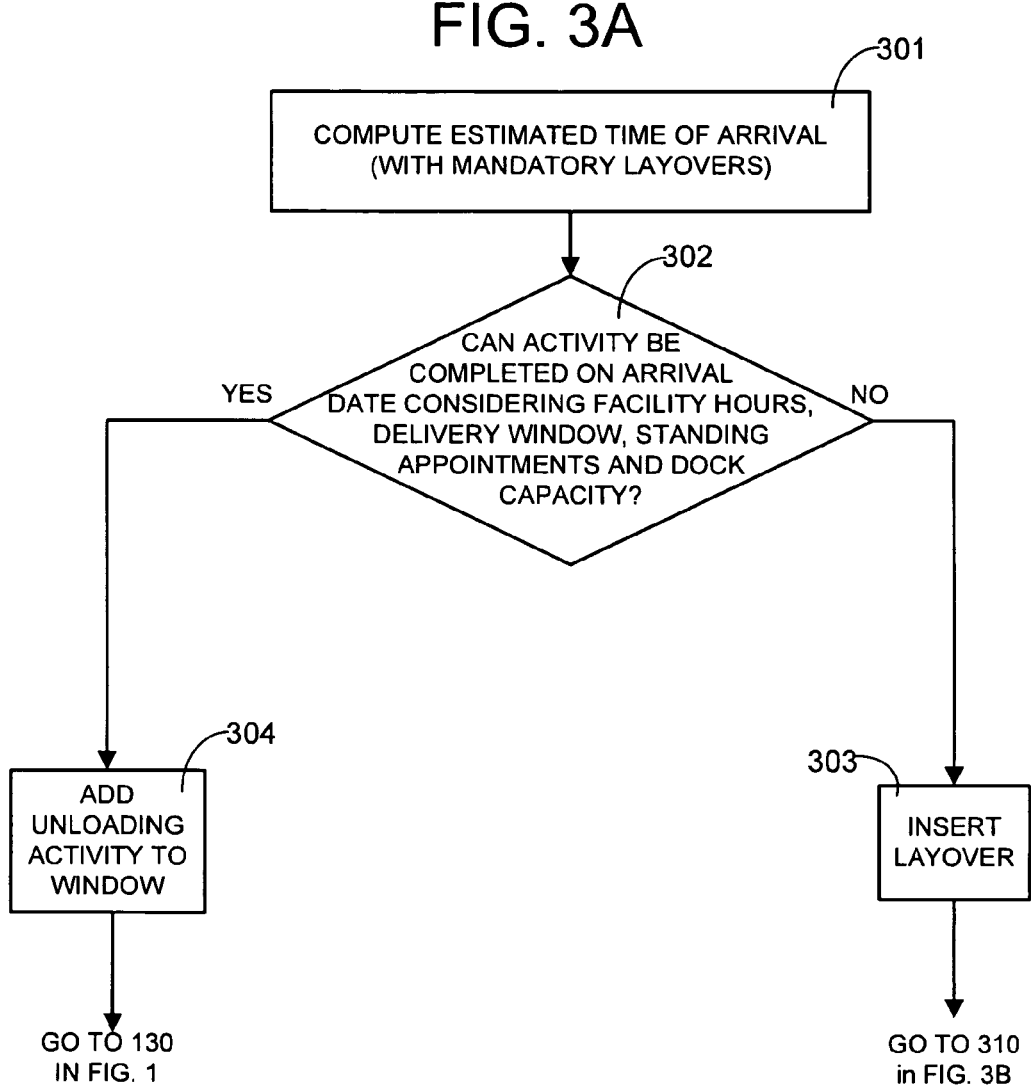

SCHEDULING WITH LAYOVERS AND LAYOVER CHARGE COMPUTATION IN TRANSPORTATION PLANNING

BACKGROUND

A layover occurs when a driver of a truck waits (typically, but not necessarily, overnight) before continuing with the activity he/she was doing (such as driving). Many layovers are mandated by rules of a government, and less frequently the rules of a carrier that owns or operates the truck. For example, under recently announced U.S. Federal rules, truck drivers are not allowed to drive (A) more than 11 hours, following 10 hours off-duty, (B) beyond the 14th hour after coming on-duty, following 10 hours off-duty, and (C) after 60/70 hours on-duty in 7/8 consecutive days (a driver may restart a 7/8 consecutive day period after taking 34 or more consecutive hours off duty). Note that these are merely exemplary of government rules; variants could be in effect in other jurisdictions or at other times. Carriers may also impose layover-related rules upon themselves or commit such rules to their driver forces for the purposes of improving driver quality of life and thereby better attracting and retaining these employees.

When truckload transportation carriers are hired by shippers to carry goods, layovers incurred as a result of such rules while driving enroute between origin and destination normally do not result in charges to the shippers. As per U.S. Federal rules, such layovers are recorded in a log. For example, after a layover has been completed, the start time and the end time of the layover is recorded in the log. Such recording may be done either manually or automatically. Automatic creation and maintenance of driver activity logs is described in, for example, U.S. Pat. No. 6,526,341 granted to Bird, et al. on Feb. 25, 2003 and entitled "Paperless log system and method". See also U.S. Pat. No. 5,886,331 granted to Lyons, Jr. on Mar. 23, 1999 and entitled "Electronic calculator for determining truck driver log book values." Both these patents are incorporated by reference herein in their entirety.

In addition to the above-described mandatory layovers during extended stretches of driving, it may be necessary for a mission to incur a layover at the time of delivery at a destination, or during pickup at an origin, or both. If a layover during delivery and/or pickup is not caused by or attributable to the carrier or government rules, then the carrier will typically charge the shipper for the layover so that the carrier is compensated for lost time and potentially lost revenue from their resources (human and physical). For example, suppose that a truck and driver arrive at a destination at 4:30 PM and both the destination's operating hours and the carrier's defined business hours end at 5 PM. If unloading will require 1-2 hours then, because there is only half an hour until the facility closes, unloading will not be able to complete until the following day. Because the trucking carrier's definition of "normal" business hours ends at the same time, the truckload carrier's rules implicitly recognize it as "reasonable" for the completion of unloading to wait until the next day, so there will be no charges to the shipper as a result of the layover. However, if the truck arrives at its destination at 3:30 PM, then there is sufficient time before the carrier's defined "normal" close of business at 5 PM to unload the truck. In this case, if a layover is caused because the consignee's dock closes at 4 PM or if the consignee's dock is busy unloading other shipments, then the carrier will charge for the layover.

The cost of a charged layover is typically specified by the carrier to be a fixed amount, for example, $275 per overnight layover during the week. If the layover is incurred over a weekend, then the charge may depend on the distance traveled between the last stop before and the first stop after the layover (effectively, the distance covered during the weekend). A weekend layover is commonly charged in the following situations:

a) The truck's physical arrival time at a facility augmented by the required load and/or unload time there falls within a weekend (Saturday or Sunday) and the loading/unloading activity at the facility occurs after that weekend. The distance used to determine the charge is based on the distance between the previous facility in the trip's itinerary and this facility.

b) The truck's physical arrival time at a facility augmented by the required load and/or unload time there falls on Friday but after closing hours on Friday according to the carrier's defined "normal" business hours (or "layover calendar"), a schedule of operation used for the purposes of layover rate determination. The distance used to determine the layover charge is based on the distance between the previous stop in the trip's itinerary and this facility.

c) The truck's physical arrival time at a facility augmented by the required load and/or unload time there falls on Friday before closing hours according to the layover calendar but the loading and/or unloading activity there takes place after the weekend. Distance used to determine the layover charge is equal to zero.

On the other hand, a weekday layover is charged when a truck's physical arrival time at a facility augmented by the required load and/or unload time falls within a weekday (Monday through Friday) during hours of operation (according to the carrier's layover calendar) and a layover is scheduled to take place at that time while the actual loading/unloading of the truck occurs at a later time. A weekday layover fee is charged once per weeknight satisfying such condition.

SUMMARY

A computer is programmed, in accordance with the invention, to automatically (1) schedule a proposed mission for transporting freight considering when layover(s) must occur based on certain constraints, (2) determine charge(s), if any, for these layover(s), depending at least partially on certain rules on chargeability of layovers, and (3) use the layover charge(s), among other factors, to decide whether to perform the proposed mission. Use of to-be-incurred layover charges in transportation planning as just described improves optimization. This is because missions that truly yield a lower total cost including layover charge(s), are selected during an optimization phase of transportation planning in accordance with the invention.

In some embodiments, the computer is programmed to automatically maintain, when scheduling a proposed mission, counters for certain attributes of the mission (such as on-duty hours, driving hours, and driving distance within a rolling period of, e.g. 6 hours, 24 hours or 7 days in duration) on which maximum limits are imposed by governmental or other rules. The counters are maintained relative to a window that provides a limited view (e.g. of at most the rolling period's duration) of various activities that are to be performed in the proposed mission. The computer is further programmed to schedule activities to be performed in the mission, relative to the applicable time window, in a first-in-first-out manner, and if an activity (such as driving between two points) is too long (e.g. exceeds a maximum limit) it is divided up, with one more layovers (called "mandatory" layovers) inserted between portions thereof.

In several embodiments, the computer also determines an estimated time of arrival, including consideration of mandatory layovers, to reach the mission's destination(s) based on the mission's schedule, and inserts one or more additional layover(s) (called "non-mandatory" layovers) at the destination(s) if the computer determines that unloading (and loading in case of some multi-stop missions) cannot be completed within a predetermined duration from arrival. The just-described non-mandatory layovers may be required by, for example, an estimated time for completion of the unloading activity occurring after the destination's close of business or if during an estimated unloading period, the destination is already scheduled to service another mission and thereby congested. Presence of such non-mandatory layovers may or may not impose an additional charge, depending on the estimated time of arrival relative to the end of the carrier's defined "normal" business hours (or "layover calendar"). Determining the existence of non-mandatory layover(s) and their related charge(s) improves the optimization phase of transportation planning as described herein.

BRIEF DESCRIPTION OF THE FIGURES

FIG. 1 illustrates, in a high-level flow chart, a method performed by a computer programmed in accordance with the invention to compute layover charges in a proposed mission between an origin and a destination and use the computed layover charges in transportation planning.

FIG. 3A illustrates, in an intermediate-level flow chart, scheduling operations 113 and 114 of FIG. 1 performed to ensure that one or more constraints at a destination facility are met.

DETAILED DESCRIPTION

Figure 2A:
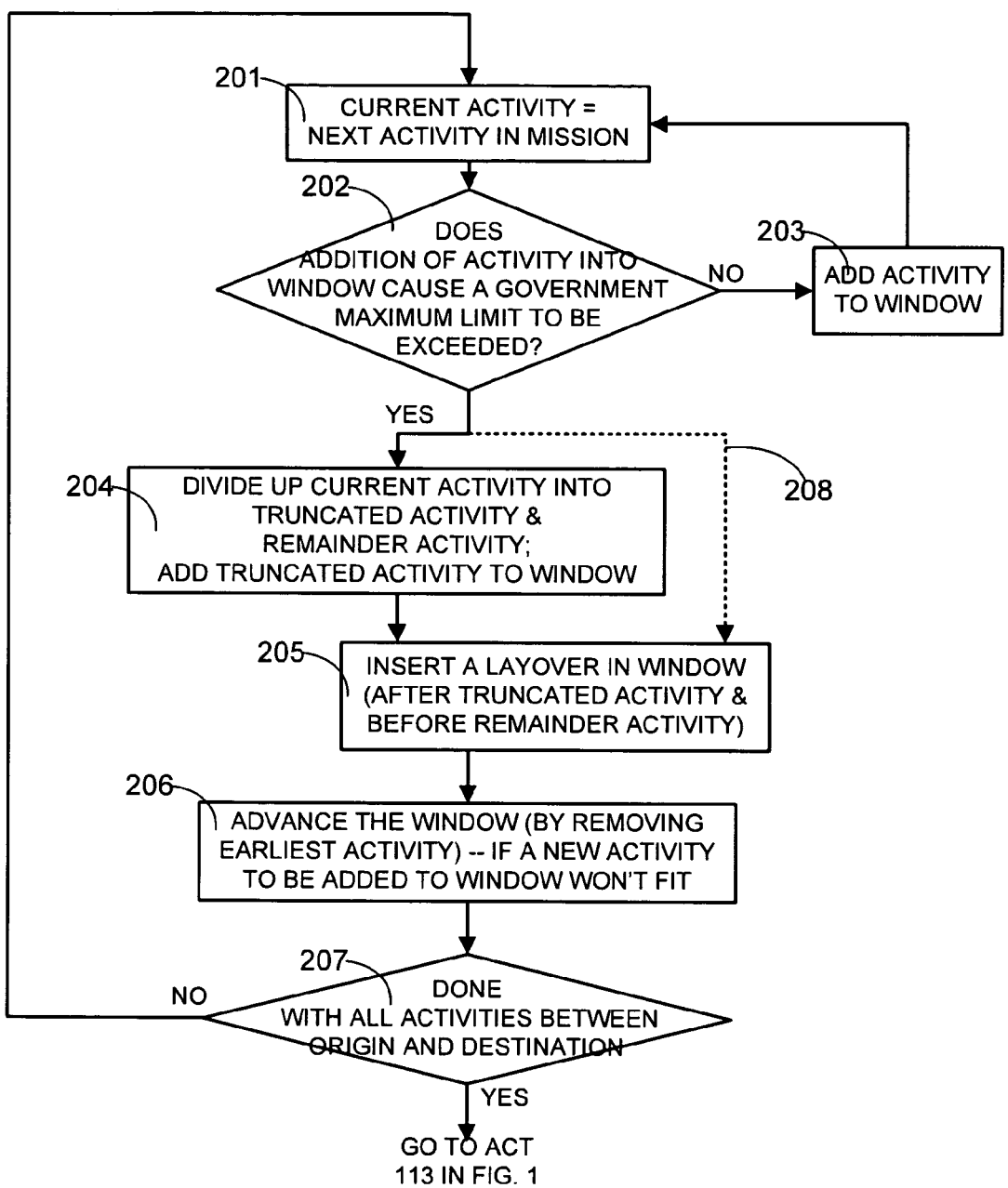
FIG. 2A illustrates, in an intermediate-level flow chart, scheduling operations 111 and 112 of FIG. 1 performed to ensure that layover-related rules are met.

In planning movement of freight (i.e. cargo), by use of one or more for-hire carriers that operate vehicles freely on public highways, a computer is programmed, in accordance with the invention, to automatically schedule a proposed mission by inserting (as per operation 110 in FIG. 1) one or more layover(s) into the mission as per certain constraints, and furthermore to automatically determine (as per operation 120) any charge(s) for the layover(s), depending at least partially on certain rules regarding chargeability of layovers. Thereafter, as per operation 130, a decision is made, in an optimization phase of transportation planning, as to whether or not the proposed mission should be performed, depending at least partially on the charge(s) for layover(s). In many embodiments, the decision in operation 130 is made completely automatically by the computer, although other embodiments seek and obtain a transportation planner's (human's) approval in deciding on performance (or deletion) of proposed mission(s) that require layovers (and the related layover charges). Note that in the following description, a mission is also referred to as a "trip" and is used synonymously with "journey" and "voyage".

To the knowledge of the present inventors, no prior art software, prior to performance of a mission, when the mission is still in proposal form, determines the precise timing impact of mandatory layovers; determines an arrival time at the destination based on this impact; and computes any to-be-incurred layover charges in the proposed mission due to non-mandatory layovers that may be required due to no fault of the carrier. In prior art, driver's logs are usually generated only during or after performance of the mission, and for this reason layover charges are not known explicitly by the shipper until the carrier's truck and driver physically arrive at the destination (for dropoff) or origin (for pickup) and the carrier invoices the shipper for all related charges. Therefore, layover charges to be incurred in a proposed mission are not used in prior art transportation planning software.

Even assuming that users of prior art software may have visually examined their optimization results on screen or on paper and (by "eyeballing") been able to identify some situations where layover charges would occur, making judgment calls about whether to sustain or delete the corresponding truckload trips (replacing them by shipping each constituent shipment separately by more expensive less-than-truckload modes), that process would be error-prone. This manual process is not only prone to omissions but is also impractical for large plans consisting of hundreds or thousands of daily truckload trips. Furthermore, even if the user manually caught every such instance correctly, the results with some truckloads dissolved and their contents sent by less-than-truckload modes, would generally be suboptimal. Hence, layover charges of the type described herein are not used in prior art transportation planning software, even if manually used to some limited extent in prior art transportation planning.

In contrast, most embodiments of this invention determine any yet-to-be-incurred layover charges (based on a detailed schedule of the mission), and include these charges when optimizing transportation plans (i.e. when deciding which of several proposed missions are to be in fact performed). Determining layover charges that are yet to be incurred, and using them during preparation of a transportation plan yields savings in the overall cost of performing missions in the plan, i.e. provides a more optimal plan than prior art. For example, suppose that three shipments can be transported separately from their origins to their destinations by less-than-truckload means for a total cost of $2,500. Suppose also that, alternatively, the three shipments can be consolidated into a single multi-stop truckload at a cost of $2,600, of which $250 constitutes a weekday layover charge. A transportation planning optimization tool that lacked the ability to consider layover charges would only have visibility to $2,300 of the truckload's cost. As such, it would consider this the more economical means of transporting the three shipments and would include it in its output plan. Presumably, this truckload trip would then be executed and the shipper would only after the fact discover the liability for an additional $250 of cost. On the other hand, a transportation planning optimization tool of the type described herein predicts layover charges by recognizing the full $2,600 of the truckload's cost in advance. Therefore, it would properly identify separate less-than-truckload transportation as the more economical means of shipping these items, resulting in a realized cost of $2,500 and a savings of $100.

In addition, the more precise timing information (scheduled arrival and departure times) helps to eliminate potential problems when multi-leg itineraries are created (for a discussion of multi-leg itineraries, see the commonly-owned U.S. patent application Ser. No. 11/113,514, entitled "TRANSPORTATION PLANNING WITH MULTI-LEVEL POOLING MODEL", filed on Apr. 25, 2005 by Rongming Sun et al. that is incorporated by reference herein in its entirety). If layover requirements are not correctly modeled, a transportation planning tool can produce estimates of arrival times that, in reality, are too early actually to be attained. If such an invalid arrival time is projected at a location when shipments are to be transshipped to other trips or other means of transportation, the subsequent transportation may be scheduled to depart early as well. If the invalid, early arrival time is not recognized in advance and the downstream transportation rescheduled to a later time, then the problem will only be discovered in "real time" while being executed. This would result in a missed connection or other operational breakdown. As such, the correct modeling of layovers and related factors in a transportation planning system can help to prevent operational disruptions.

A proposed mission, whose economic viability is yet to be decided by performance of method 100 (FIG. 1) is created prior to operation 110 in any manner, e.g. manually or automatically. Proposed mission(s) are created automatically, by a suitably programmed computer of some embodiments, by consolidating (i.e. grouping) multiple shipment orders for travel by Truckload service, wherein each shipment would otherwise have traveled by less-than-truckload (LTL) service or parcel service. One such method is described in a co-pending, concurrently-filed, and commonly-owned U.S. patent application Ser. No. 11/136,045 entitled MISSION-SPECIFIC VEHICLE CAPACITY CONSTRAINTS IN TRANSPORTATION PLANNING by Roy Isaac Peterkofsky et al. that is incorporated by reference herein in its entirety. Note that the specific manner in which a mission is proposed for consideration in transportation planning can be different in different embodiments of the invention.

Several embodiments of the invention check for two types of conditions followed by insertion of layovers if necessary, when performing operation 110, which follows an act 101 in which a mission is proposed. The mission may be proposed in any manner, and may be the result of load consolidation or other such optimization. Thereafter, as illustrated in FIG. 1, one or more predetermined rules (e.g. government and/or carrier rules on layovers) are applied in an act 111 and if a rule is not met by the current activity, then a layover (which is mandated by government or other rules) is inserted in act 112. On completion of act 112 and also if the answer in act 111 is no, control transfers to act 113. In act 113, the computer checks on the destination's ability to support loading/unloading on the day of arrival of the mission at the destination (based on constraints such as (1) the shipment's allowed delivery/pickup time window, (2) non-availability of a dock due to congestion from earlier mission(s), (3) previously agreed standing appointment times at the facility for the carrier, and/or (4) hours of operation of destination facility).

If the destination permits loading/unloading on the day of arrival (which is checked in act 113) but is unable to perform unloading/loading immediately on arrival for any such reasons, then a waiting time is inserted in act 115 and the on-duty time counter is incremented by the amount of waiting time. If the waiting time causes the value of the on-duty counter to exceed the maximum allowed on-duty time (which is checked in act 116), the waiting time is replaced by a layover or layovers in act 114. Act 114 is also performed if the result in act 113 is No (i.e. destination does not permit loading/unloading on arrival date).

Since carriers may charge shippers for non-mandatory layovers (e.g. depending on a carrier's defined "normal" business hours), on completion of act 114 control transfers to operation 120, wherein a charge for the layover is computed. On the other hand, if a mandatory layover is inserted (in act 112) or if a layover is not required in act 113, then control transfers to operation 130, wherein a decision is made as to whether or not the mission is to be performed, based on its total cost (including layover charges if any).

Checking for conformance with government and other rules and inserting mandatory layovers when needed, as illustrated in acts 111 and 112 may be performed in any manner, depending on the embodiment. Some embodiments view all activities in a proposed mission through a window that identifies activities whose conformance with governmental and other rules is being checked, as illustrated by acts 201-207 (FIG. 2A). The window of these embodiments has counters associated thereto that are used to ensure that activities in any period of a predetermined duration (e.g. duration 4 hours, 24 hours, or 7 days) satisfy certain government-set or other maximum limits, e.g. driving hours and/or driving distance and/or on-duty hours. The counters are maintained relative to a window's back end. The window's back end is separated in time from the window's front end by the predetermined duration (e.g. 4 hours, 24 hours, or 7 days duration) in which activities in the proposed mission are examined. This window is moved forward in time, one activity at a time, to examine each successive set of activities to be performed in the mission, in the fixed duration. Once the window has been used to examine all activities in the mission, checking of the proposed mission for compliance with the government's rules is complete.

Figure 2B:
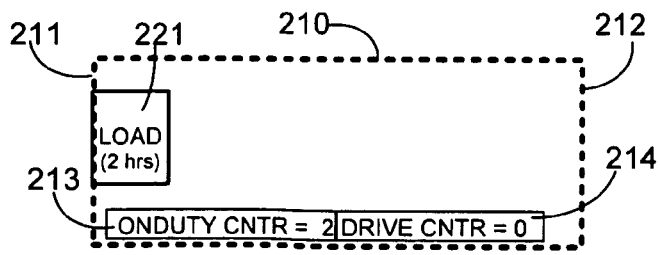
FIGS. 2B-2K illustrate division of a driving activity and insertion of a mandatory layover therein by certain embodiments of the invention that use a moving window to schedule a mission.

In act 201, the computer is programmed to set as the current activity, a next activity that is to be performed in the mission. For example, initially, the current activity is set to a loading activity which is the first activity in a mission. When act 201 is performed next, the current activity may be set to a driving activity which normally follows a loading activity. At a later time, the current activity may be set to a waiting activity if necessary to wait for a dock to become available for unloading, and thereafter the current activity is set to an unloading activity. Referring to FIG. 2A, after act 201, the computer is programmed to check (in act 202) whether or not the addition of the current activity (e.g. loading activity) to a window (which is empty initially) will cause any of three or more maximum limits (set by government) to be exceeded. If the result of act 202 is no, the computer is programmed to go to act 203 and add the activity to the window. FIG. 2B illustrates a loading activity 221 which is added to a window 210. Loading activity 221 is the first activity in a mission 220 that includes additional activities which are not yet in the window, such as a driving activity 222 (FIG. 2C) and an unloading activity 227 (FIG. 2I).

Some embodiments of the moving window have a queue pointer at front end 212 and another queue pointer at back end 211; these two pointers, are used in a data structure called "QUEUE" that is well known in the art of computer programming. In the example shown in FIG. 2C, the window is of fixed size, i.e. the front end 212 is always the predetermined duration (in this example 24 hours) away from back end 211 as shown, even when there is only one activity in the window. Although the window is of fixed size, it is moving and always starts from the beginning of the first activity in the queue. If at any moment, the sum of the duration of all activities in the queue is more than 24 hours (in this example), the first activity is popped out. The computer of these embodiments is programmed to enforce that the sum of duration of all activities is less than or equal to 24 hours (in this example). Note that when 24 hours is used as a predetermined duration in the following description of some embodiments and also used in FIG. 2L, this value of 24 is merely illustrative (i.e. the value is different in other embodiments).

Figure 2C:
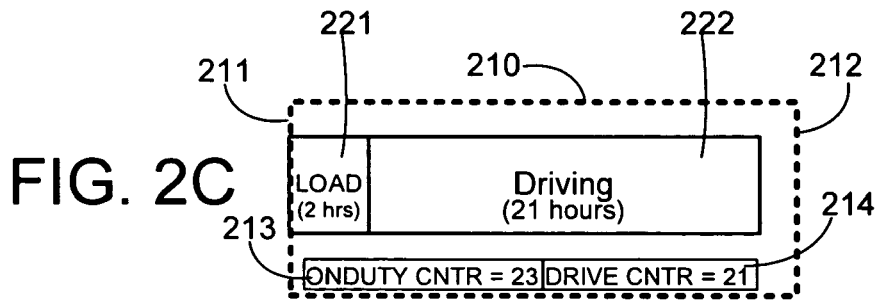

After performing act 203 (FIG. 2A), the computer is programmed to return to act 201 wherein the current activity is updated to be the next activity (e.g. in this example the driving activity 222 in FIG. 2C). In act 202 (FIG. 2A) if the answer is yes (i.e. that a government rule is violated by addition of current activity 222 to window 210 as per FIG. 2C), then the computer is further programmed to perform act 204 wherein the current activity is divided up into (1) a truncated activity and (2) a remainder activity, followed by transfer of control to act 205. Note that in some embodiments only one type of activity namely the driving activity is divided up in act 204 and this dividing act is skipped if the current activity is any other type of activity, such as an unloading activity or a waiting activity (as per branch 208), and control transfers directly to act 205. In act 205, the computer is programmed to create and insert a layover activity into the window. If the current activity is divided up, then the layover activity is inserted immediately following the truncated activity and preceding the remainder activity. If the current activity is not divided up, then the layover activity is inserted either prior to or subsequent to the current activity (depending on whether another layover already exists prior to the current activity and if so the layover activity is inserted subsequent to the current activity).

In the example illustrated in FIG. 2C, the point-to-point driving activity 222 is 21 hours long which itself alone violates all U.S. government rules that impose maximum limits (e.g. 11 hours limit for driving and 14 hours limit for being on-duty). Note that although only two counters 213 and 214 are shown in FIG. 2B (wherein drive counter is zero), in embodiments that apply the rules of some governments, there is a third counter (not shown) for the driving distance. Other rules may be formulated that involved further and different counters. Moreover, in the example illustrated in FIG. 2C, driving activity 222 plus loading activity 221 together cause window 210's on-duty counter 213 to have the value 23 and driving hours counter 214 to have the value 21 (see FIG. 2C) both of which exceed their corresponding limits of values 14 and 10.

Appendix A contains pseudo-code for computation of the on-duty counter, driving hours counter and driving distance counter, and their comparisons with corresponding maximums, to identify which of them is reached first. In the embodiment of Appendix A, at a high level, whenever a new activity is added to the back end of the activity queue, one or more counters are updated by adding the duration of this activity. The classification of the activity determines which counter(s) are affected by it. In this embodiment, driving activity goes into all three counters, waiting time/unloading/loading activities go into only the on-duty counter, and layover activity goes into no counter at all. If any activity is popped out from the front end of the queue, the corresponding counter is reduced accordingly.

When the applicable maximum limits are being exceeded, in act 204 a driving activity (such as activity 222 in FIG. 2C) which is about to be added to the window is divided up into two driving activities. In the example illustrated in FIG. 2C, the computer is programmed to create a truncated driving activity 222T and remainder driving activity 222R (FIG. 2H) which replace the single driving activity 222. Division of an activity into two activities is illustrated in Appendix A.

In act 204, the computer is further programmed to add to the window, the first of two newly-created driving activities (e.g. truncated driving activity 222T is added to window 210). The computer is programmed to select for this first driving activity, a duration whose value causes just one of the government's maximum limits to be reached. In the example illustrated in FIGS. 2B-2C, the duration for activity 222T is selected to be 10 hours, because the maximum limit of 10 hours on driving is reached first (i.e. the maximum limit of 14 hours on-duty is not yet reached because the sum of the two activities 221 and 222T is only 12 hours). Computation of the duration of the truncated driving activity and computation of duration of the remainder driving activity are illustrated in Appendix A.

Figure 2D:
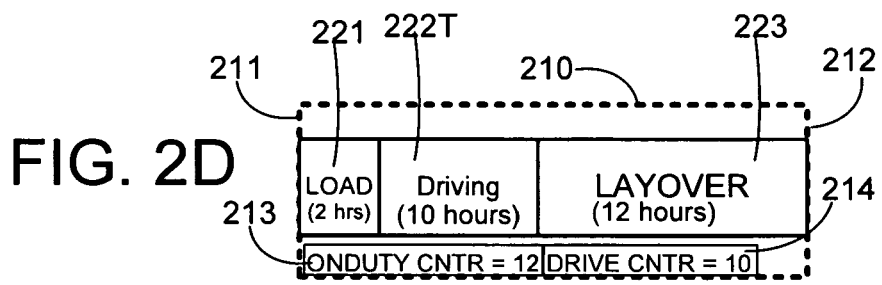

Next, in act 205 (FIG. 2A), a new layover activity is inserted (e.g. activity 223 is inserted as shown in FIG. 2D) immediately after the first new driving activity (e.g. immediately after activity 222T). Note that the duration of layover activity 223 has a predetermined minimum value (e.g. 10 hours) that is set by the transportation planner (human) ahead of time, prior to invocation of software that performs method 100.

At this stage, the duration of layover activity 223 is set to be any value greater than the predetermined minimum value which is required to extend the total hours in the window to the window's nominal size, e.g. 24 hours. In the example illustrated in FIGS. 2B-2D, since the window size prior to addition of the layover activity would have been only 12 hours (consisting of 2 hours of loading activity 221 and 10 hours of driving activity 222T), an additional 12 hours are needed to reach the nominal size, and for this reason the computer is programmed to set the layover activity 223's duration to the value 12 hours. Also at this stage, i.e. in act 205, one or more counters which are associated with the window are updated, based on activities currently in the window, including the newly-inserted layover activity. In window 210 illustrated in FIG. 2D, on-duty counter 213 is updated to have the value 12 and driving hours counter 214 to have the value 10. Computation of the duration of the layover activity is illustrated in Appendix A. Note that on-duty counter, driving hours counter and driving distance counter are not affected when a layover is added to the back end of the activity queue.

After performance of act 205 in which a layover was inserted, the computer is programmed to advance the window (in act 206), e.g. by removing its earliest activity that is located at a front end 211 of the window 210. Note that the window is advanced in act 206 only if addition of the next activity will cause the duration of all activities in the window to exceed 24 hours. In the example illustrated in FIGS. 2B-2D, the next activity is the remainder driving activity 222R which is of duration 11 hours and hence the total duration in the window exceeds 24 hours. Hence, act 206 is performed to move front end 211 of window 210 by the duration (of value 2 hours) of the loading activity 221 which is being removed, thereby to make room in the window to receive a new activity of the same duration.

At this stage (i.e. in act 206), one or more counters which are associated with the window are updated, based on activities currently in the window, i.e. excluding the newly-removed activity (e.g. activity 221). In window 210 illustrated in FIG. 2E, on-duty counter 213 is updated to have the value 10 and driving hours counter 214 remains at value 10 (because loading activity 221 which has just been removed did not involve driving). Counters are updated by performing the following acts while the total of all activities in activity queue is >=the size of the moving time window:

```
Forward shift the moving window by removing its earliest activity
(i.e., driving, unload/load, or wait)
Set On-duty Hour Counter −= activity duration
If it's a driving activity
{
    Set Driving Hour Counter −= activity duration
    Set Mileage Counter −= activity distance
}
```

Figure 2E:
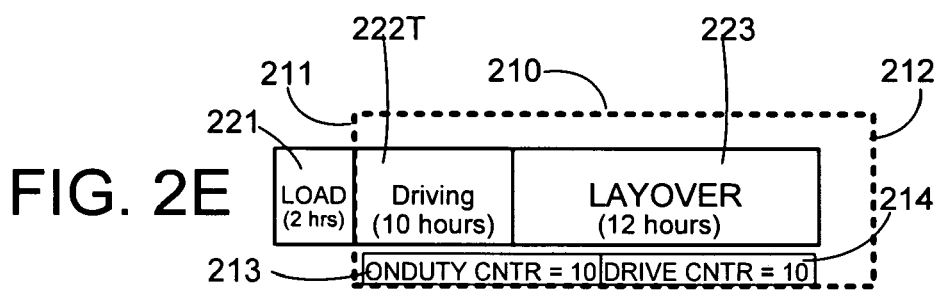
Figure 2F:
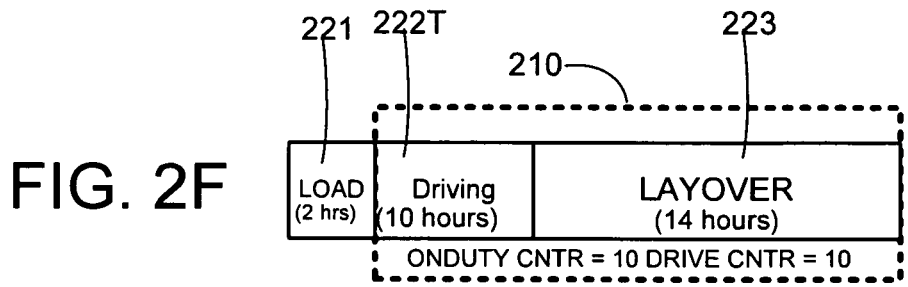

After performing act 206, the computer goes to act 207 and checks if all activities that need to be performed in the mission have been completed and if not returns to act 201 (discussed above). In the example illustrated in FIG. 2C, the driving activity 222 was previously truncated in act 204, and hence the remainder driving activity 222R (FIG. 2H) is now set as the current activity (i.e. in act 201) which is to be added to queue (FIG. 2E). At this stage, in this example, addition of the remainder driving activity 222R of duration 11 hours from the queue into the window will cause the government maximum limits to be exceeded (in fact this activity itself exceeds the maximum driving hours limit of 10 hours). For this reason, the result of act 202 is "YES" and branch 208 is now taken and a variant of act 205 is performed wherein layover activity 223 which is previously inserted is now extended so that the window is back to its nominal duration of 24 hours. As stated in the Appendix A, computation of the length (i.e. duration) of the layover in FIG. 2D is as below:

layoverLength=24−total on-duty time of the queue by counting from the start of driving activity=24−10=14 (hours)

So at that time, the computer knows the length of this layover to be 14 hours instead of 12 hours by looking from the start of the driving activity.

Figure 2G:
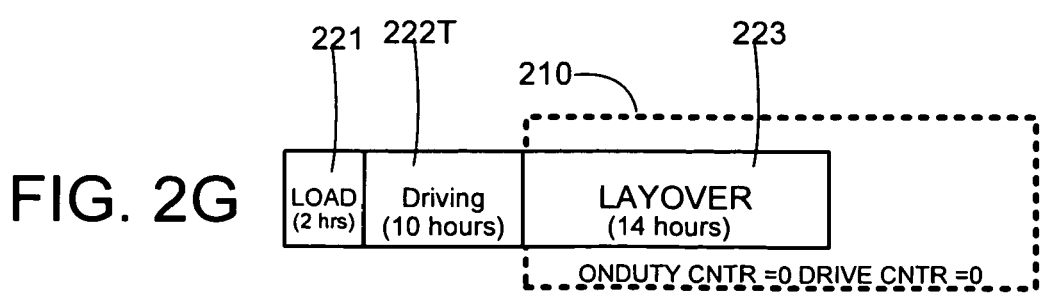
Figure 2H:
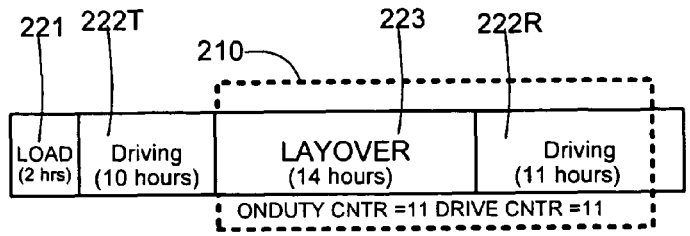
Figure 2I:
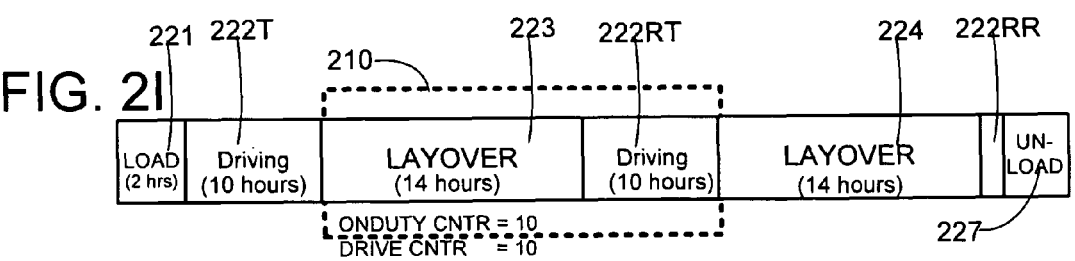
Figure 2J:
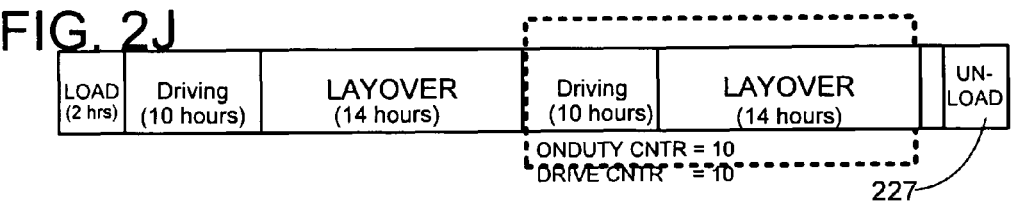
Figure 2K:
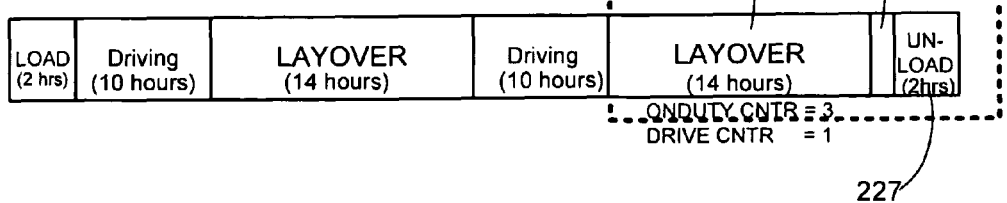

After performance of act 205 in which layover activity 224 is extended, the computer again advances the window (in act 206), e.g. by removing its earliest activity 222T that is located at a front end 211 of the window 210 as shown in FIG. 2G. Note that removal of activity 222T from window 210 now makes room in the window to receive a new driving activity of the same duration, i.e. 10 hours. Therefore, the computer performs act 207, takes the NO branch, and returns to act 201 wherein activity 222R is now the current activity, and once again act 202 finds that addition of activity 222R of 11 hours duration will exceed the government limits (see FIG. 2H). At this time, act 204 is performed in the above-described manner, wherein activity 222R is divided up into a 10 hour driving activity 222RT and a 1 hour driving activity 222RR (see FIG. 2I), followed by act 205 in which a new layover activity 224 is inserted (see FIG. 2J). In this manner, execution continues, until all activities in a proposed mission are examined through window 210 (FIG. 2K), at which time the YES branch is taken from act 207.

As noted above, in some embodiments, the computer automatically maintains, for a given mission, counters 213 and 214 for certain attributes of the mission (such as on-duty hours, driving hours, and a counter for driving distance which is not shown in FIGS. 2B-2K), on which certain maximum limits are imposed by the government or otherwise. Note that other embodiments may maintain other counters, depending on the governmental rules in effect in the country where the transportation plan is to be executed and on the self-imposed rules of the carriers to execute the plan. Moreover, although certain counters are maintained to ensure a mission's compliance with governmental rules, other counters may be additionally maintained in other embodiments e.g. to ensure compliance with rules or procedures of a private party (e.g. the carrier which is responsible for actual performance of the mission on the ground).

As noted above, for certain activities (such as the driving activity), when a counter exceeds a corresponding maximum limit, the computer automatically divides up a current activity in the mission into a truncated activity and a remainder activity between which a layover is inserted. However, for certain other activities (such as a loading activity, a waiting activity or an unloading activity), a layover activity is inserted into the mission without dividing up the current activity, either before or after the current activity.

Figure 2L:
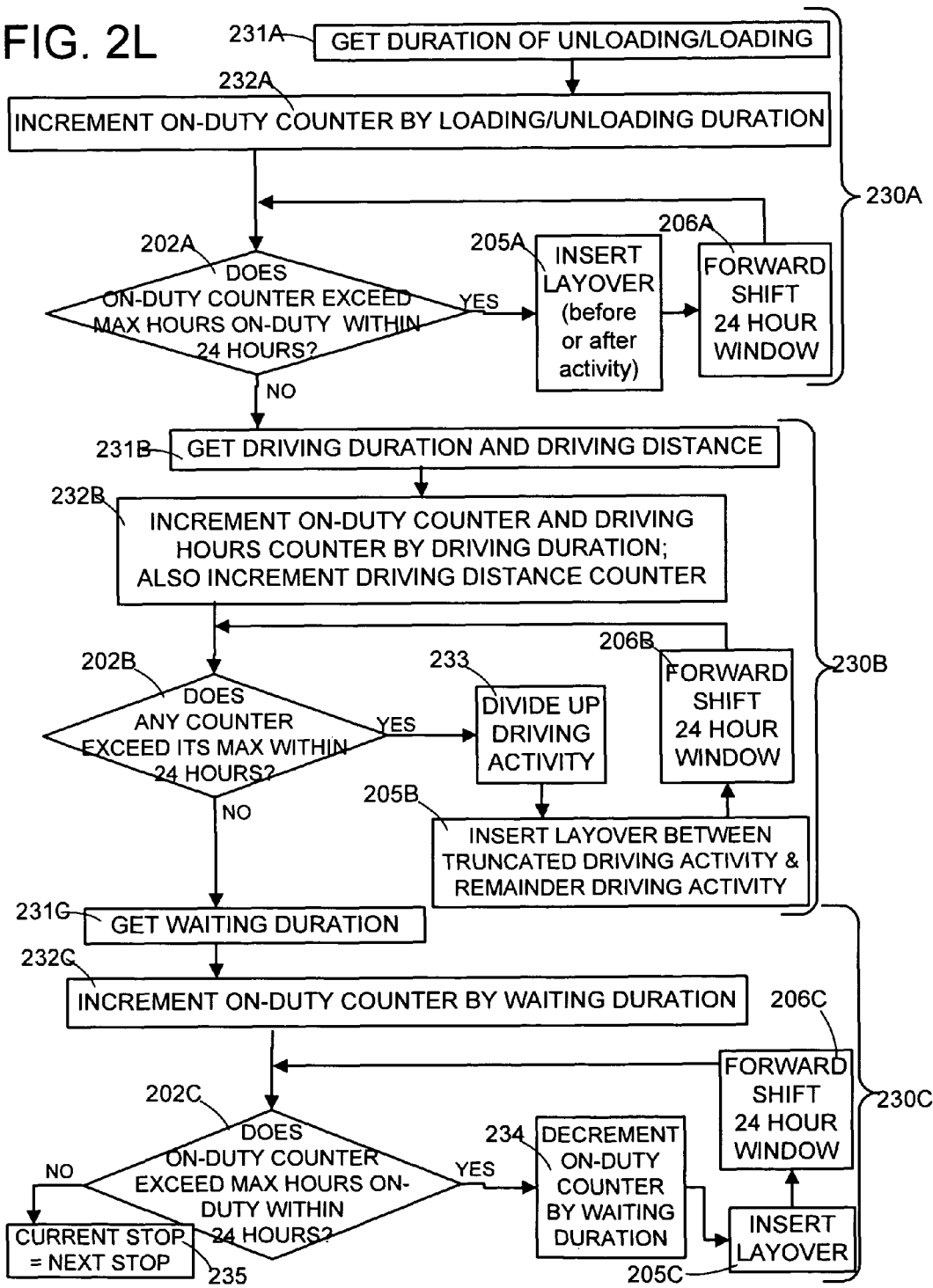
FIG. 2L illustrates, in an low-level flow chart, one illustrative implementation of the type shown generically in FIG. 2A.

One illustrative implementation of the above-described embodiment shown in FIG. 2A unrolls the performance of acts 202 and 205 into a separate individual version for each of (A) loading activity (B) driving activity and (C) waiting activity that are individually examined in three respective operations, namely examine operation 230A that is customized for loading and unloading activities, examine operation 230B that is customized for driving activities, and examine operation 230C that is customized for waiting activities, as illustrated in FIG. 2L and described next. The three operations 230A-230C are performed sequentially, one after another, at each stop in a given mission, starting with the very first stop in the mission. Prior to performance of any of operations 230A-230C, the counters are initialized to zero (i.e. Mileage Counter=0, Driving Hour Counter=0, and On-duty Hour Counter=0); thereafter, the computer get the allowed unload/load start time at the first stop, sets current stop=first stop; and Iterate through each trip stop. In this illustrative implementation, a loading activity (as well as an unloading activity) at a current stop in a proposed mission (which is initially the very first stop) is subjected to examine operation 230A, by performance of at least acts 231A, 232A, 202A, 205A and 206A (FIG. 2L).

Specifically, in act 231A, the computer fetches a duration of the loading/unloading activity, e.g. from a database that holds details about the proposed mission. Thereafter, in act 232A, the computer increments a counter that is affected by the loading/unloading activity (namely the on-duty counter) by the amount of the duration (obtained in act 231A). As noted in logic expressed in pseudo-code in paragraph [0043], all counters are initially set to zero, prior to act 232A. Next, in act 202A, the computer checks if the on-duty counter exceeds the maximum limit for on-duty hours set by governmental rules, and if it does exceed then the computer goes to act 205A to insert a layover (in the above-described manner), which causes the duration of activity queue to be longer than 24 hour moving time window, and then performs act 206A to forward shift (i.e. advance) the (24-hour) window, and thereafter returns to act 202A. Note that updating of counters, as well as addition of the loading/unloading activity to the window is not shown in FIG. 2L, in order to make the drawing easier to understand. However, in this implementation counters are updated in operation 230A and the activity is inserted after (or without) layover insertion, as shown in the logic for performance of examine operation 230A, which is expressed in pseudo-code, as shown in Appendix B. Total unload/load hours are computed as Loading/unloading hours=volumes of shipments to be loaded/unloaded at current facility divided by Loading/Unloading speed at this facility. Moreover, on-duty counter=the existing value of on-duty counter+duration of an activity being added to the queue if this activity is not a layover A driving activity at a current stop in the proposed mission is subjected to examine operation 230B, by performance of acts 231B, 232B, 202B, 233, 205B and 206B. Specifically, in act 231B, the computer fetches a duration of the driving activity as well as the driving distance from the current stop to the next stop in the proposed mission, e.g. retrieves these data from the database that holds details about the proposed mission. Thereafter, in act 232B, the computer increments the on-duty counter and the driving hours counter by the driving duration, and also increments the driving distance counter by the driving distance. Next, in act 202B, the computer checks if any of the three counters exceeds its corresponding maximum limit (as set by governmental rules), and if more than one counter violates the limit then also identifies which limit is first violated. If a counter does exceed its limit, then the computer goes to act 233 to divide up the driving activity (as noted above in reference to FIG. 2A), followed by insertion of a layover in act 205B (also in the above-described manner), followed by performance of act 206B to forward shift (i.e. advance) the window. Logic for performance of examine operation 230B is expressed in pseudo-code in Appendix A. Note that the logic of inserting layovers as described herein guarantees that all three counters are not violated. So there is no need to update counters at the moment of truncate driving activity and adding layover. However, after layover is added and time window is shifted, the computer is programmed to update all three counters by using the same logic against the newly removed activity.

After performance of operation 230B, a waiting activity at the next stop in the proposed mission is identified, and subjected to examine operation 230C, by performance of acts 231C, 232C, 202C, 234, 205C and 206C. Specifically, in act 231C, the computer computes the duration of waiting, by subtracting the arrival time t1 at the next stop, e.g. the back end 212 of window 210 (FIG. 2K) from a start time t2 that is permitted at the next stop, for the unloading activity. Thereafter, the computer increments the on-duty counter by the waiting duration. Next, in act 202C, the computer checks if the on-duty counter will exceed its corresponding maximum limit (as set by governmental rules) if the waiting activity is added to the window. If so, the computer goes to act 234 to restore the on-duty counter to its value before the waiting activity (e.g. by decrementing it), followed by insertion of a layover in act 205C (also in the above-described manner), followed by performance of act 206C to forward shift (i.e. advance) the window. Hence, the unloading activity will need to be performed after the layover activity. Logic for performance of examine operation 230C is expressed in pseudo-code in Appendix C.

In some embodiments, acts 113 and 114 to insert non-mandatory layovers are implemented by performing acts 301-304 illustrated in FIG. 3A. Specifically, in act 301, the computer computes an estimated time to start unloading (including mandatory layovers) at the destination facility. Next, in act 302 the computer checks (as per act 302) if the estimated unload start time and unload duration (i.e. a specific period during which unloading is to be performed) can be accommodated within the destination facility's normal business hours. In this act, the computer may make other checks, e.g. as to whether the destination facility's dock is scheduled to be busy during the estimated unloading period, and the delivery window for the mission.

If the result of act 302 is no, then the computer simply adds the unloading activity to the window as per act 304, and thereafter proceeds to act 130 (FIG. 1). Note that in case of multi-stop mission, instead of immediately going to act 130 as illustrated in FIG. 3A, another act 235 (FIG. 2L) is performed followed by returning to acts 110 and 120, until all stops have been examined at which stage control transfers to act 130.

If the result of act 302 is no, the computer performs act 303. In act 303 the computer inserts a layover activity which may or may not be chargeable (as determined by act 310 in FIG. 3B). Specifically, in act 310, the computer checks if the estimated duration for unloading and/or loading causes the time for completion of this activity to fall beyond the carrier's close of business. If yes, then the computer deems the layover (inserted in act 303 in FIG. 3A) to be free, and thereafter proceeds to act 130 (FIG. 1) either directly (if there are no un-examined stops) or via act 235 (if there are additional stops to be examined as discussed in the previous paragraph). If the result in act 310 is no, then the computer deems the layover to be chargeable, and charge is determined (by performing act 120 in FIG. 1), as illustrated in acts 311-314 in FIG. 3B.

Whenever reaching a trip stop, the computer computes the allowed unload/load start time (i.e. t2 as mentioned in pseudo-code in Appendix C) at this stop by checking the orders' delivery/pickup time window, hours of operations at this facility/stop, facility dock capacity, and facility-carrier standing appointment. Then, some wait time or layover(s) may be arranged based on the logic mentioned in pseudo-code in Appendix C. The computer is programmed to compute the allowed unload/load start time at a trip stop as follows. The computer gets the intersected delivery/pickup time window of all the orders at this stop, and then iterates on the following for each time bucket within the delivery/pickup time window:

```
If (hours of operations at this facility is open AND
    this facility still has available dock AND
    it respects the facility-carrier standing appointment)
        Set this time bucket as Yes
Else
        Set this time bucket as No
```

Figure 3B:
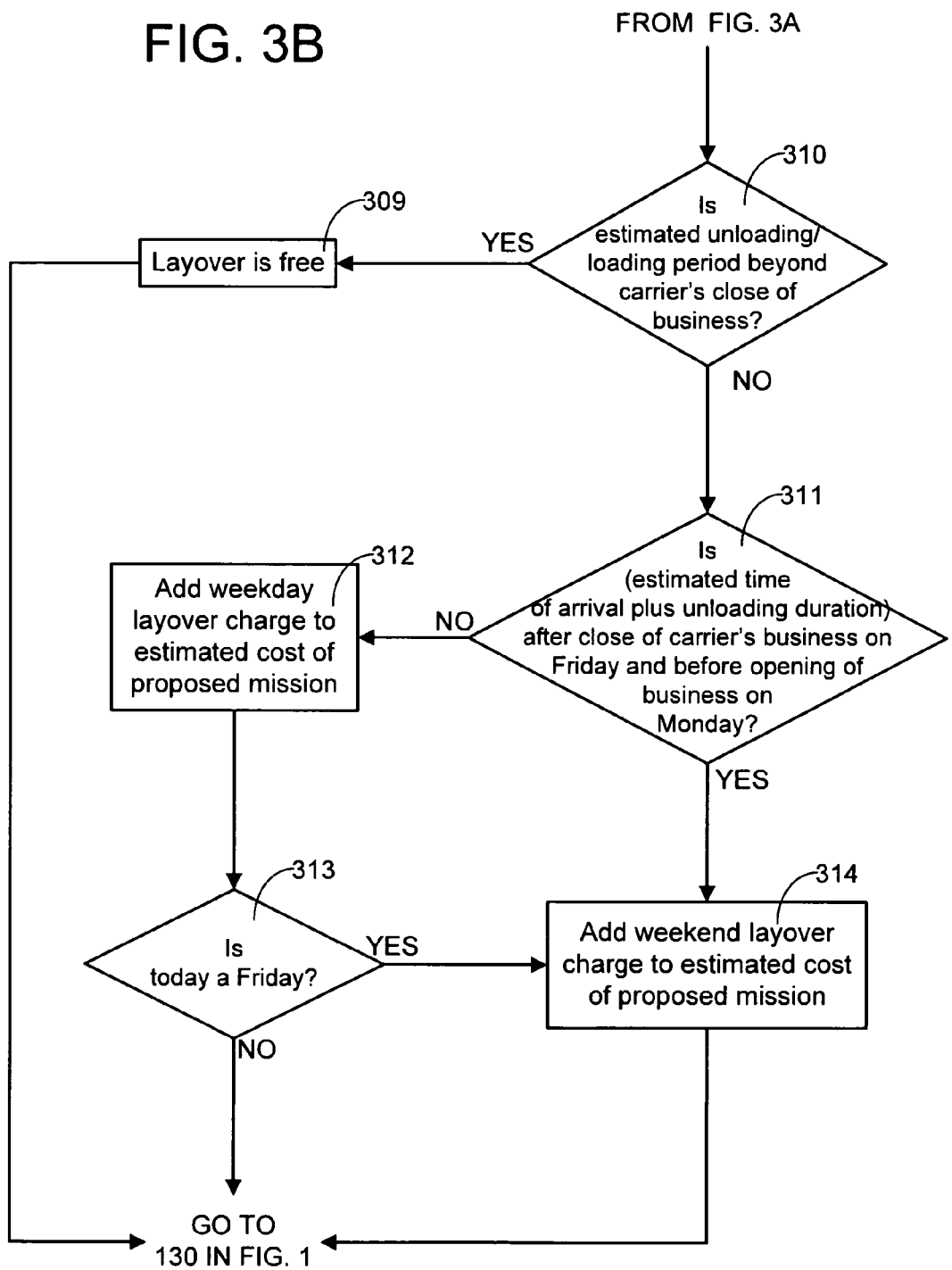
FIG. 3B illustrates, in a flow chart, acts performed in some embodiments of the invention to determine a charge for a layover, based on certain rules regarding chargeability of layovers.

Thereafter, the computer sets numOfBlocks=total unload/load time divided by the predetermined length of time bucket, and then starting from the beginning of this delivery/pickup time window, searches for a continuous block of time buckets with value=Yes, and set the allowed load/unload start time=the start time of the found continuous block Determining a charge for a non-mandatory layover activity as per act 120 is implemented by programming the computer of some embodiments to perform acts 311-314 as illustrated in FIG. 3B. Specifically, in act 311, the computer checks if the estimated time of completion of the unloading activity falls after the carrier's close of business on a Friday and before the opening of business on Monday (i.e. during the weekend), and if not then goes to act 312. Note that performance of act 312 is typically required when, through no fault of the carrier, the destination facility is unable to perform the unloading activity. In act 312, the computer retrieves a charge due to a weekday layover (e.g. from a database), and determines that this charge is to be incurred by the proposed mission, and adds this charge to an estimated cost of the proposed mission. Next, in act 313, the computer checks if the weekday layover is starting on a Friday, and if not then goes to act 130 (FIG. 1) either directly or via act 235 (as discussed above).

In act 313 if the weekday layover begins on a Friday, or in act 311 if the answer is yes, then act 314 is performed. In act 314, the computer retrieves a charge due to a weekend layover (e.g. from a database), and determines that this charge is to be incurred by the proposed mission, and adds this charge to an estimated cost of the proposed mission. Note that in doing so, the computer is programmed to treat two midnights in the weekend (i.e. Saturday and Sunday) as a single midnight for the purpose of computing the weekend charge. Thereafter, the computer again goes to act 130 (FIG. 1) either directly or via act 235 (as discussed above). Appendix D below provides pseudo-code for acts at the level of detail shown in FIG. 3B.

Figure 4A:
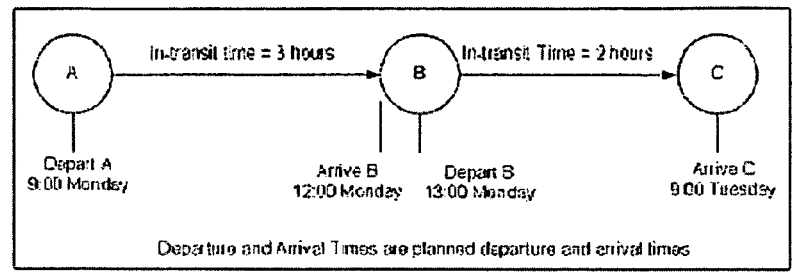
FIGS. 4A-4K illustrate examples in which layovers are inserted into a mission by certain embodiments of the invention, based on an estimated time of arrival that in turn is determined by use of the moving window of FIGS. 2B-2K.

In an example shown in FIG. 4A, driving time from B to C is only 2 hours and the unloading and loading activity at C takes 1 hour. The carrier's general business hours are 8:00 a.m. to 5:00 p.m., Monday to Friday. In this case, the estimated arrival time for a mission at Facility C is 15:00 Monday and the unloading and loading activity lasts for 1 hour which is 16:00 Monday. However, the delivery time at facility C for this mission is only at 9:00 Tuesday. In this case, the computer, when appropriately programmed (as shown in FIG. 3B) determines that a weekday layover charge applies. This is because the driver has sufficient time to drive from facility B to facility C and perform unloading or loading activity at facility C on Monday by 16:00 hours, but has to wait until Tuesday morning 9:00 a.m. In this example, act 312 is performed (FIG. 3B), and the weekday layover charge of $275 (a predetermined amount) is added to the total cost of the proposed mission.

If instead of scheduling the delivery at facility C on Tuesday at 9:00 a.m., the delivery time was scheduled at facility C at 11:00 Wednesday, the computer is programmed to determine that the layover spans across two midnights, Monday and Tuesday, in acts 113-114 (FIG. 1), and therefore schedule the mission with two non-mandatory layovers at the end. The computer is further programmed (FIG. 3B), to compute total layover charges in this case to be 2*$275=$550. For the schedules of two layovers, please refer to pseudo-code in Appendix C.

In some embodiments, weekend layover charges are incurred if the estimated arrival time at a destination facility plus the unloading or loading time required at the facility falls after the carrier's general business hours on Friday and before general business hours on Monday. The planned arrival time is during general business hours on Monday. Weekend layover charges are defined based on the distance from the pickup or delivery stop before the weekend to the stop after the weekend. A transportation planner (human) can define weekend layover charges with distance breaks. For example: 1201-1500 miles: $100, 1001-1200 miles: $200, 501-1000 miles: $400, 0-500 miles: $600. In some situations, both weekday and weekend layover charges may be incurred.

Figure 4B:
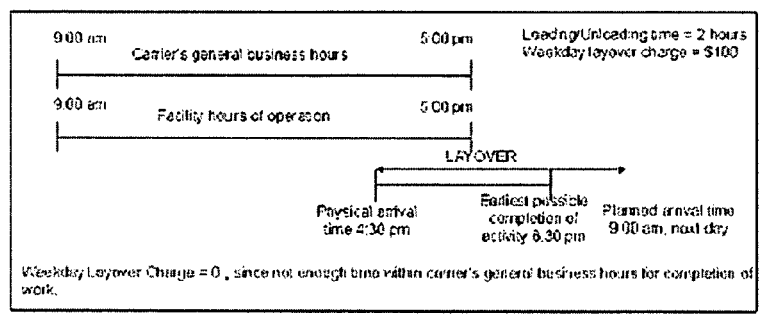
Figure 4C:
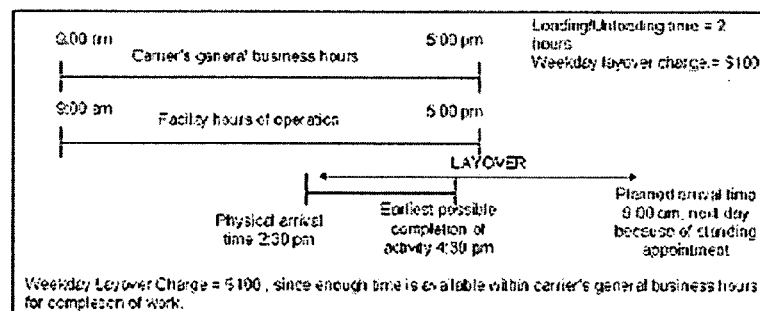

In FIG. 4B, a carrier's defined "normal" business hours are from 9:00 a.m. to 5:00 p.m. and the destination facility's hours of operation are from 9:00 a.m. to 5:00 p.m. The estimated loading and unloading time at the facility is 2 hours and the weekday layover charge is specified as $100. A mission's estimated arrival time at the facility is 4:30 p.m. on Monday while the planned delivery time, that is, the time at which the facility can unload shipments in the mission is 9:00 a.m. on Tuesday. The estimated arrival time of 4:30 p.m. leaves only 0.5 hours within the carrier's general business hours to complete the work, while 2 hours of activity is required. In such a case, the computer is programmed to insert a non-mandatory layover (as per acts 113-114 in FIG. 1), but no weekday layover charge is incurred because not enough hours are available within the carrier's general business hours to complete the loading and unloading of the delivery. Refer to pseudo-code provided in Appendix D, where last else clause covers weekday case and only a charge is incurred if estimated end time is before close time of layover calendar In FIG. 4C, the carrier's defined "normal" business hours are from 9:00 a.m. to 5:00 p.m. and the destination facility's hours of operation are from 9:00 a.m. to 5:00 p.m. The estimated loading and unloading time at the facility is 2 hours and the weekday layover charge is set at $100. If the estimated arrival time of the truck at the facility is 2:30 p.m. on Monday and the planned delivery time is 9:00 a.m. on Tuesday, then the computer, when appropriately programmed as described herein, inserts a weekday layover, and computes the layover charge to be $100 (as per acts 303 and 312 in FIGS. 3A and 3B). This is because the estimated arrival time of the truck at 2:30 p.m. provides sufficient time for completion of loading and unloading activity, which requires 2 hours, by 4:30 pm, which is within the carrier's general business hours. This type of scenario occurs, for example, when an incoming truck's processing is deferred until a standing appointment the next day. Again, refer to pseudo-code provided in Appendix D (where last else clause covers weekday case and a charge is incurred if estimated end time occurs before close time of layover calendar).

Figure 4D:
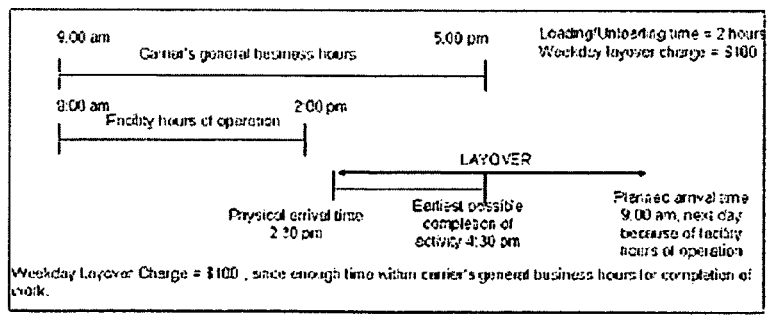

In FIG. 4D, the carrier's general business hours are from 9:00 a.m. to 5:00 p.m. and the destination facility's hours of operation are from 9:00 a.m. to 2:00 p.m. The estimated loading and unloading time at the facility is 2 hours and the weekday layover charge is set at $100. The truck's estimated arrival time at the facility is outside the facility's hours of operation, which ends at 2:30 p.m. This estimated arrival time still allows the completion of loading and unloading activity within the carrier's general business hours, since the activity can be completed at the earliest by 4:30 p.m. But, since the planned arrival time at 9:00 a.m. Tuesday involves an overnight delay, the computer, when appropriately programmed as illustrated in FIGS. 3A and 3B (acts 303 and 312 respectively), determines a weekday layover charge of $100. Again, see Appendix D.

Figure 4E:
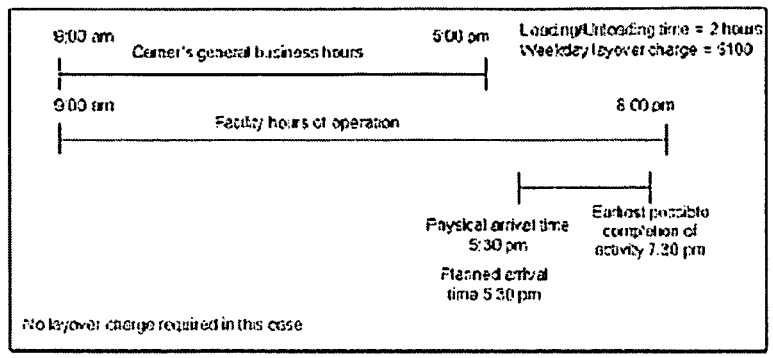

In FIG. 4E the carrier's general business hours are from 9:00 a.m. to 5:00 p.m. and the destination facility's hours of operation are from 9:00 a.m. to 8:00 p.m. The estimated loading or unloading duration at the facility is 2 hours and the weekday layover charge is set at $100. If the truck's estimated arrival time at the facility and the mission's delivery time are both 5:30 p.m., the loading and unloading activity can be completed by 7:30 p.m. within the facility's hours of operation. In this case, the computer, when appropriately programmed, determines in act 302 (FIG. 3A) that no layover charge is incurred because the carrier arrives at the facility after its general business hours. The handling of the trip occurs after those hours only because of the late arrival, not because of a delay from an earlier arrival. In this case no layover is scheduled, since unload/load activity occurs right after arrival to facility. See the description of FIG. 3A, act 302.

Figure 4F:
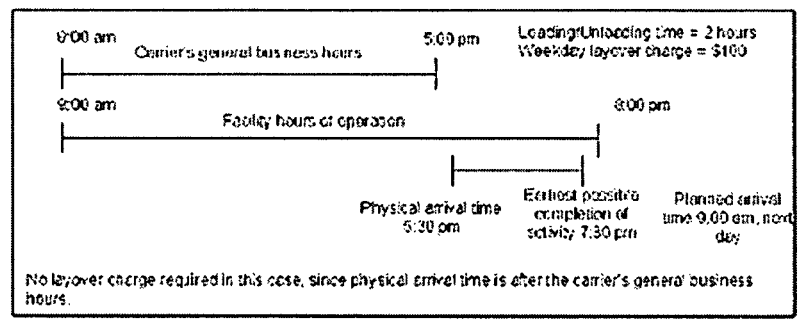

In FIG. 4F, the carrier's defined "normal" business hours are from 9:00 a.m. to 5:00 p.m. and the destination facility's hours of operation are from 9:00 a.m. to 8:00 p.m. The estimated loading and unloading time at the facility is 2 hours and the weekday layover charge is set at $100. If the truck physically arrives at the facility at 5:30 p.m. on Monday, but the planned arrival time of the truck at the facility is 9:00 a.m., Tuesday, no layover charges are incurred. This is because the truck's physical arrival at the facility occurs after the carrier's general business hours. See Appendix D where the last else clause covers weekday case and a charge is incurred only if estimated end time is before close time of layover calendar]

Figure 4G:
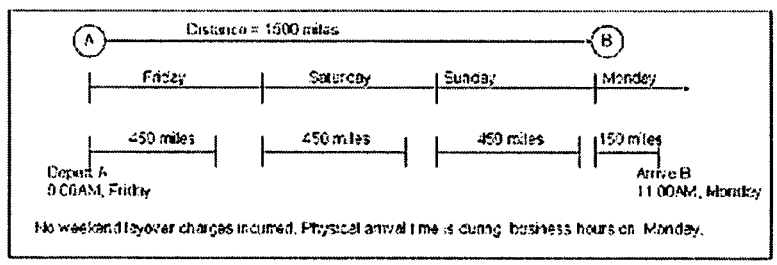

FIG. 4G illustrates a truckload move from origin A to destination B. The distance from A to B is 1500 miles. The departure time from A is 9:00 a.m., Friday and the arrival time of truck at destination B is at 11:00 a.m., Monday. No weekend layover charges are incurred by the shipper in this scenario because physical and planned arrival time is during business hours on Monday.

Figure 4H:
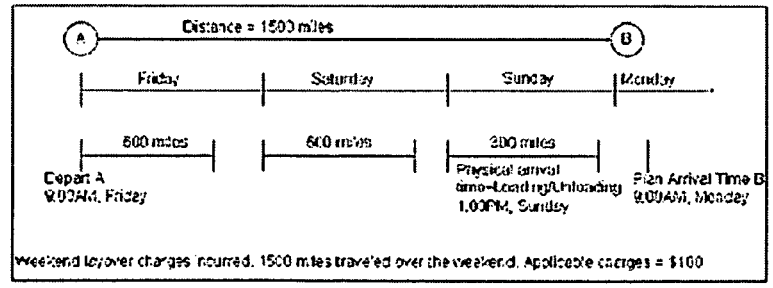

FIG. 4H illustrates a mission wherein a truck departs from origin A at 9:00 a.m., Friday and has time to arrive at destination B complete loading and unloading activity by 1:00 p.m., Sunday. If the planned arrival time at B is 9:00 a.m., Monday, the shipper incurs a weekend layover charge of $100 corresponding to the distance break of 1500 miles traveled during the weekend. See the first if block in Appendix D.

Figure 4I:
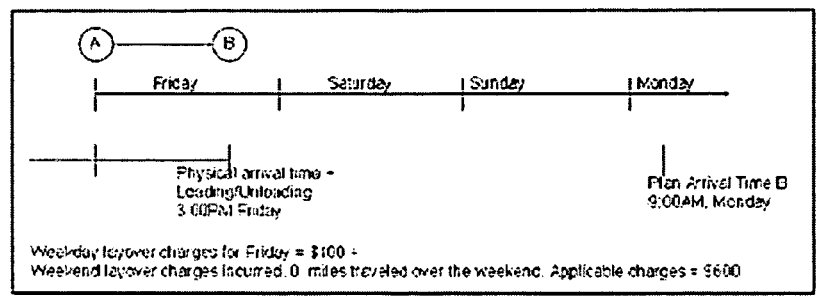

FIG. 4i illustrates a mission wherein a truck's physical arrival time at destination B plus the time required for completion of loading and unloading activity is 3:00 p.m. on Friday. If the planned arrival time at B is 9:00 a.m., Monday, the shipper incurs the following layover charges: Weekday layover charges for Friday=$100 and Weekend layover charges corresponding to distance break 0 miles traveled during the weekend=$600. Hence, total layover charges=$700. See Appendix D, second main if-block, where for a Friday estimated end time and actual unload/load on Monday or later both a weekday and a weekend layover are charged.

Figure 4J:
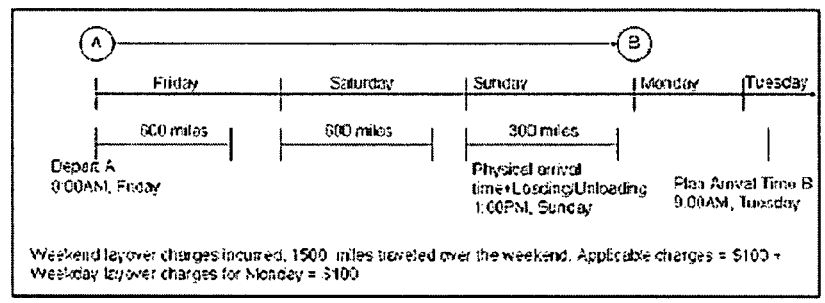

FIG. 4J illustrates a mission wherein a truck departs from A at 9:00 a.m. Friday, and arrives at destination B and can complete loading and unloading activity by 1:00 p.m. Sunday. If the planned arrival time is 9:00 a.m., Tuesday, then the layover charges incurred by the shipper is as follows: Weekend layover charges corresponding to 1500 miles traveled over the weekend=$100, plus Weekday layover charges for Monday since planned arrival time is on Tuesday=$100. Total layover charges=$200. See Appendix D, first main if-block, where for a Saturday/Sunday estimated end time and actual unload/load on Monday or later, both a weekend layover with distance between previous and next stop is charged, and as many weekday layover charges as additional weeknights spent waiting.

Figure 4K:
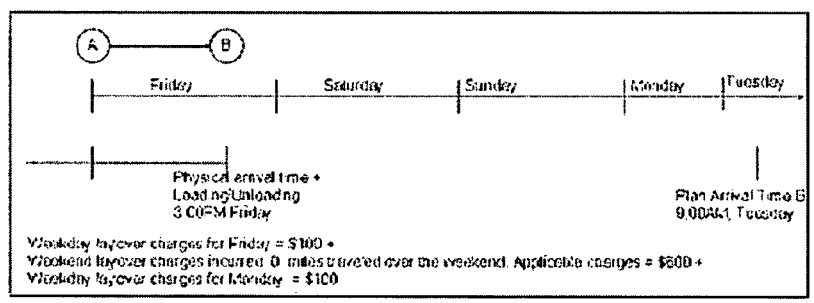

FIG. 4K illustrates a mission wherein a truck leaves origin A and can physically arrive at destination B and complete loading and unloading activity by 3:00 p.m., Friday. If the planned arrival time at destination facility B is 9:00 a.m., Tuesday, the shipper incurs the following layover charges: Weekday layover charges for Friday=$100, plus Weekend layover charges corresponding to 0 miles traveled during the weekend=$600, plus Weekday layover charges for Monday=$100. Total layover charges incurred=$800. See Appendix D, second main if-block where for a Friday estimated end time occurring before closing of carrier's layover calendar both a weekday layover charge and a weekend layover charge with zero distance are assessed. Additionally one weekday layover charge is added per weeknight spent after Monday morning.

A computer that performs acts 110 and 120 is further programmed in accordance with the invention to decide (as illustrated by act 130 in FIG. 1) on the economic value of performing the proposed mission based on total cost which includes layover charges (if any). The total cost of a mission typically includes, in addition to the layover charges described above, a number of costs, such as a distance cost, a unit cost, a time cost, a flat cost, a stop cost, loading costs, unloading costs, facility handling costs, out of route cost etc.

An illustration of how such a total cost may be computed is illustrated in the commonly-owned U.S. patent application Ser. No. 11/097,435, entitled "TRANSPORTATION PLANNING WITH PARALLEL OPTIMIZATION", filed on Apr. 1, 2005 by Rongming Sun et al. that is incorporated by reference herein in its entirety.

Use of layover charges to evaluate economic value of a proposed mission, in accordance with the invention, improves on methods of transportation planning that either (A) do not use or (B) use only inaccurately charge(s) incurred for layovers. The exact manner in which layover charges are computed and used in a computer, to determine a mission's economic value in accordance with the invention can differ, depending on the embodiment.

Once the total cost of a proposed mission is determined after performance of acts 110 and 120, thereafter the optimization phase of transportation planning which is performed in act 130 may be implemented in any manner well known in the prior art. Prior art transportation management systems that can be used for such optimization are available for direct purchase or as a web-hosted service from several vendors, such as the following:

(a) "i2 Transportation Planning and Management" available from i2 Technologies, Inc. One i2 Place, 11701 Luna Road, Dallas, Tex. 75234;

(b) "Manugistics Global Logistics Management solution" available from Manugistics, Inc. 9715 Key West Avenue, Rockville, Md. 20850

(c) GC3 (Global Command & Control Center) available from Global Logistics Technologies, 1 Reservoir Corporate Centre, Shelton, Conn. 06484;

(d) "DLx® Transportation Management System" available from Red Prairie of 20700 Swenson Drive, Waukesha, Wis. 53186; and (e) "Transportation Planning and Execution solution" available from Manhattan Associates, 2300 Windy Ridge Parkway, Suite 700, Atlanta, Ga. 30339;

(f) "Transportation Planning & Optimization" available from SAP America Inc. Strategic Planning & Support Office, 3999 West Chester Pike Newtown Square, Pa. 19073.

Note that one embodiment of the invention uses "Oracle Transportation Planning 11i.10" and "Oracle Transportation Execution 11i" both available from Oracle Corporation, 500 Oracle Parkway, Redwood Shores, Calif. 94065.

Method 100 (FIG. 1) is used to program a computer system 500 of the type illustrated in FIG. 5A which is discussed next. Specifically, computer system 500 includes a bus 502 (FIG. 5A) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions to be executed by processor 505.

Main memory 506 also may be used for storing temporary variables or other intermediate information during execution of instructions to be executed by processor 505. Computer system 500 further includes a read only memory (ROM) 508 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, transportation planning is performed by computer system 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein and illustrated in FIG. 1. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 505 for execution. Such a storage medium may take many forms, including but not limited to, non-volatile storage media, and volatile storage media. Non-volatile storage media includes, for example, optical or magnetic disks, such as storage device 510. Volatile storage media includes dynamic memory, such as main memory 506.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium from which a computer can read.

Various forms of computer readable storage media may be involved in carrying one or more sequences of one or more instructions to processor 505 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 518 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer 525 or to data equipment operated by an Internet Service Provider (ISP) 526. ISP 526 in turn provides data communication services through the world wide packet data communication network 528 now commonly referred to as the "Internet". Local network 522 and network 528 both use electrical, electromagnetic or optical signals that carry digital data streams. The signals through the various networks and the signals on network link 520 and through communication interface 518, which carry the digital data to and from computer system 500 are exemplary forms of carrier waves transporting the information.

Computer system 500 can send messages and receive data, including program code, through the network(s), network link 520 and communication interface 518. In the Internet example, a server 550 might transmit a mission (which is part of a transportation plan) through Internet 528, ISP 526, local network 522 and communication interface 515.

The instructions for performing method 100 (FIG. 1) may be executed by processor 505 as they are received, and/or stored in storage device 510, or other non-volatile storage for later execution. In this manner, computer system 500 may obtain the just-described instructions and any related data in the form of a carrier wave.

Figure 5A:
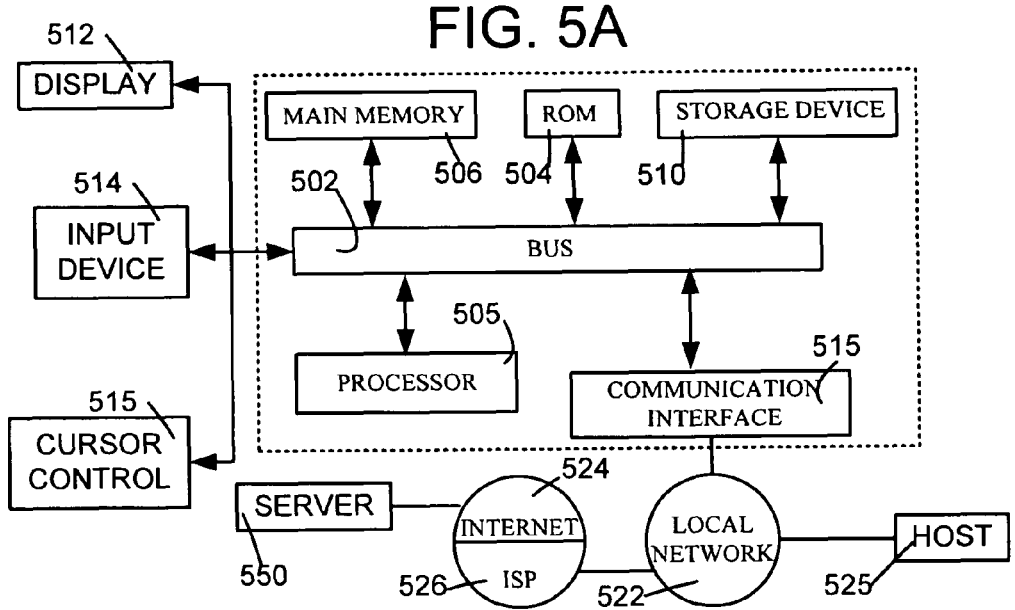
FIGS. 5A and 5B illustrate, in block diagrams, hardware and software portions of a computer that performs the method illustrated in FIG. 2A.
Figure 5B:
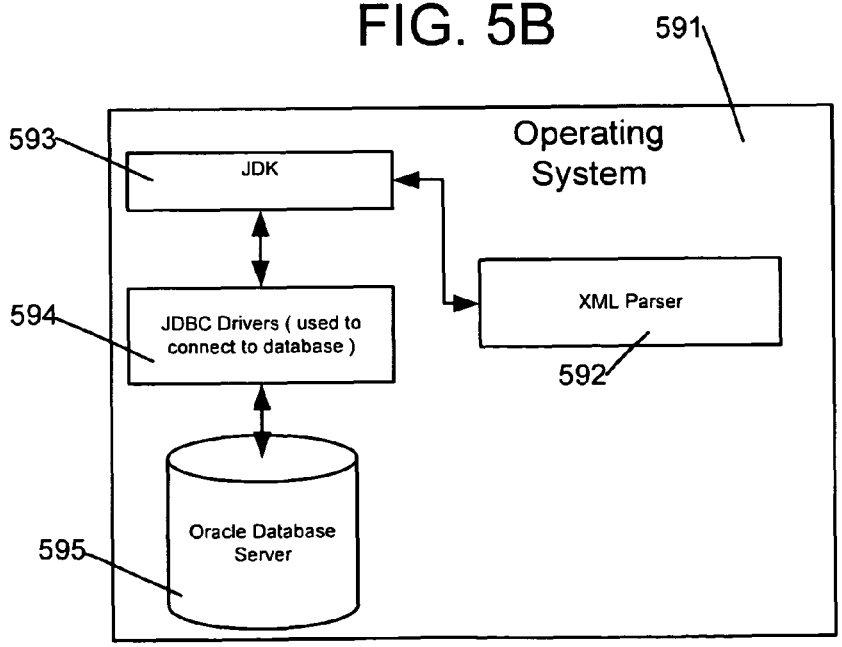

Note that FIG. 5A is a very low-level representation of many hardware components of a computer system. Several embodiments have one or more additional software components in main memory 506 as shown in FIG. 5B: Operating System 591 (e.g. Microsoft WINDOWS 2000), Database Server 595 (e.g. Oracle Server v9i2 for the source computer; e.g. Oracle Server v8i for the target computer), Java Development Kit 593 (e.g. JDK v118), Java XMLParser 592 (e.g. xmlparser available from Oracle Corporation), and JDBC drivers 594 (e.g. JDBC driver available from Oracle Corporation).

Figure 6:
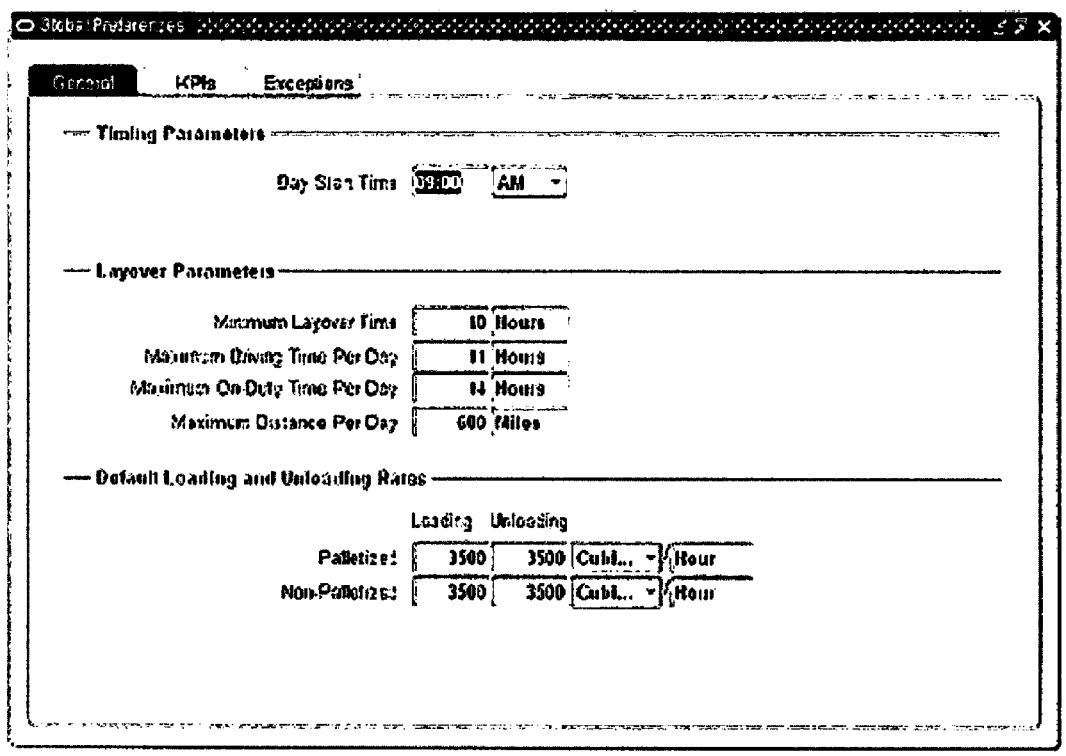
FIG. 6 illustrates, in a graphical user interface, a screen for supplying to a computer in accordance with the invention, values of maximum limits in government rules.

As illustrated in FIG. 6, in some embodiments, a transportation planner can specify the following rule parameters: Minimum layover time (for example, in hours), Maximum driving time per day (for example, in hours), Maximum on-duty time per day (for example, in hours), and Maximum distance per day (for example, in miles). The transportation planner can only enter positive values for all of the above. For example, he/she can enter values, such as 8 hours, 9.5 hours, or 100 miles. These attributes capture the constraints on driving, working, and layover times for the drivers as regulated by governmental rules and regulations. For example, in the United States, recently announced Department of Transportation rules stipulate that drivers may not do the following: Drive more than 11 hours following 10 hours of rest; Drive beyond the 14th hour after coming on-duty following 10 hours off-duty; or Drive after 60 or 70 hours on-duty in 7 or 8 consecutive days. In the Global Preferences screen illustrated in FIG. 6, these regulations can be specified as follows: Maximum driving time per day: 11 hours, Maximum on-duty time per day: 14 hours, Minimum layover time: 10 hours. These layover regulations apply at a global level to all truckload carriers and services. One can define these rules at a carrier level also in another such screen. The carrier level rules override the global preferences and can only be more restrictive than the global rules.

Numerous modifications and adaptations of the embodiments described herein will become apparent to the skilled artisan in view of this disclosure. For example, layover charges are applied in some embodiments to the construction of routes and driver schedules for a company's own fleet as opposed to for-hire truckload carrier as described above. Layover charges are also used in several embodiments as a means of comparing potential costs of using different carriers in the process of determining which carriers to enter into long-term relationships with, as opposed to the process of near-term route formation as described above. Layover charges are also used in some embodiments in the optimization of routes to be operated on a repeated periodic schedule, based on repeating periodic purchase, manufacturing, or demand schedules, as opposed to routes to be operated one time based on specific one-time orders as described above. Layover charges are further used in some embodiments to predict carrier charges for a trip and compare those to the actual billed charges for the trip as a means for identifying invoices to be audited for potential overcharges. Layover charges are also used in some embodiments to determine an accurate complete landed cost of an input supply or assembly (i.e., purchase cost plus transportation cost) for use in determining how (from which supplier or location) to source the input supply or assembly most economically.

Numerous modifications and adaptations of the embodiments described herein are encompassed by the scope of the invention.

The following Appendices A-D contain pseudocode and related description which form integral portions of this detailed description and are incorporated by reference herein in their entirety. Appendices A-D contain illustrative implementations of acts that are described above as being performed in some embodiments. Note that the following pseudocode is not written in any particular computer programming language. Instead, the pseudocode provides sufficient information for a skilled artisan to translate the pseudocode into a source code suitable for compiling into object code.

APPENDIX A

```
1    Get the driving time and distance from the current stop to
     the next stop
2    Insert driving activity to the end of queue
3    Set On-duty Hour Counter += driving hours
4    Set Driving Hour Counter += driving hours
5    Set Mileage Counter += driving distance
6    Initialize remainingTravelHour = driving hours
7    Initialize remainingDistance = driving distance
8    // While at least one counter reaches the max limit
9    While (On-duty Hour Counter >= Max On-duty Hour In 24
     Hours OR
10       Driving Hour Counter >= Max Driving Hour In 24
         Hours OR
11       Mileage Counter >= Max Distance In 24 Hours )
12   {
13       //Compute the percentage of violation for each of
         three counters
14       Set percentDistance = (Mileage Counter – Max
         Distance In 24
15   Hours) / driving distance
16       Set percentOnDutyHour = (On-duty Hour Counter –
         Max On-duty
17   Hour In 24 Hours) / driving hours
18       Set percentDriveHour = (Driving Hour Counter –
         Max Driving Hour
19   In 24 Hours) / driving hours
20       //Get the maximum percentage of violation among
         three counters,
21       //and the counter with maximum percentage of violation
22       //corresponds to the max limit being reached first
23       Set maxPercentage = maximum (percentDistance,
         percentOnDutyHour, percentDriveHour)
```

APPENDIX A-continued

```
25       //Truncate the driving activity by updating the
         inserted driving
26       activity (last entry) in the queue, with new truncated
         time and
27       distance as below:
28       Set its time = remainingTravelHour – maxPercentage *
         driving hours
29       Set its distance = remainingDistance – maxPercentage
         * driving
30   distance
31       // Compute the length of layover as below
32       Set Min Layover Hour = predetermined minimum value
         for layover
33       //If on-duty counter is the one that hits the max limit
         first
34       If (maxPercentage == percentOnDutyHour )
35           Set layoverLength = maximum (24.0 – Max On-duty
             Hour In
36           24 Hours, Min Layover Hour)
37       else // maxPercentage is equal to percentDriveHour or
38       //percentDistance, meaning that Max Driving Hour In 24
         Hours or
39       //Max Distance In 24 Hours hits but Max On-duty Hour In
         24 Hours
40       //hasn't
41       {
42           // The hitting point is in the middle of driving
43           If (maxPercentage > 0.0 )
44           {
45               //Must insert a layover and the next activity
                 is the
46               //reminder driving activity
47               Set layoverLength = 24.0 – total on-duty
                 time of the
48               queue by counting from the start of driving
                 activity
49               If ( layoverLength < Min Layover Hour )
50                   Set layoverLength = Min Layover Hour;
51           }
52           else // The hitting point happens to be the next stop
53               //No need to schedule layover, since driving
                 activity is
54               //done, and still can be on-duty
55               Set layoverLength = 0.0
56       }
57       If layover length is greater than 0.0
58       {
59           Insert a layover (after the truncated driving
             activity) to the end
60           of the queue
61           Forward shift the 24-hour window by pop out
             activities from
62           the beginning of the queue (until the total time
             of all
63           remaining activities in the queue falls below 24
             hours)
64           // Update remainingTravelHour and remainingDistance
65           remainingTravelHour = maxPercentage * driving
             hours
66           remainingDistance = maxPercentage * driving
             distance
67           Create a new remainder driving activity and insert
             it to the
68           end of the queue as below:
69           Set its time = remainingTravelHour
70           Set its distance = remainingDistance
71       }
72       else
73           break the while loop
74   }
```

APPENDIX B

```
1
2    Compute the total unload/load hours at this stop;
3    Insert unloading/loading activity to the end of the
```

APPENDIX B-continued

```
    queue
4   Set On-duty Hour Counter += total unload/load
    hours;
5   Set layoverLengthDueToOnDuty = maximum (24.0 –
    Max On-duty
6   Hour In 24 Hours, Min Layover Hour)
7   While (On-duty Hour Counter >= Max On-duty Hour
    Within
8   24 Hours)
9   {
10      If (On-duty Hour Counter > Max On-duty Hour
        Within 24
11      Hours AND no layover inserted before this
        unload/load)
12      {
13          Set layoverLength = layoverLengthDueToOnDuty
14          Insert the layover right before the unload/load
            activity
15      }
16      Else // On-duty Hour Counter == Max On-
        duty Hour Within
17      24 Hours OR one layover has been inserted before
        this
18      unload/load) //
19      {
20          Set layoverLength = layoverLengthDueToOnDuty
21          Insert the layover right after the unload/load
            activity
22      }
23      Forward shift the moving 24-hour window and accordingly
        update
24      the three counters.
25  }
```

APPENDIX C

```
1   Compute the arrival time (t1) at the next stop;
2   Compute the allowed unload/load start time (t2) at the next
    stop;
3   Then wait time before unload/load at the next stop = t2 –
    t1;
4   Insert such waiting activity;
5   Set On-duty Hour Counter += wait hour;
6   If (On-duty Hour Counter >= Max On-duty Hour Within 24
    Hours)
7   {
8   All the wait time will be consumed by layover(s):
9   Remove the above newly inserted waiting activity
10  update On-duty Hour Counter -= wait time and
11  compute the number of required layovers by counting
    midnights;
12  Replace the wait time with the right number of layover(s),
13  with the first one starting at the beginning of wait time;
14  Forward shift the moving 24-hour window and
15  accordingly update those three counters.
16  }
17  Set the current stop = the next stop;
18  Note that Arrival Time at next stop = departure time
    from previous stop +
19  sum of duration for all driving activities in between +
    sum of duration of all
20  layovers in between.
21  Moreover, the number of required layovers, and the duration
    of each
22  layover, are computed as follows.
23  Set Min Layover Hour = predetermined minimum value for
    layover
24  Set layoverLengthDueToOnDuty = maximum (24.0 – Max On-
    duty Hour In
25  24 Hours, Min Layover Hour)
26  If ( wait time < layoverLengthDueToOnDuty )
27  { // Only one layover is required
28      Set numOfLayovers = 1;
29      Set layoverLength = layoverLengthDueToOnDuty;
30  }
31  else // wait time >= layoverLengthDueToOnDuty
```

APPENDIX C-continued

```
32  {
33      Starting from arrival time (t1) at the next stop to
        the allowed
34  unload/load start time (t2) at the next stop, count the
    total number of
35  midnights (i.e. 12 am at night).
36      Set numOfLayovers = the total number of midnights
        from t1 to t2
37  // If it doesn't cross midnight
38      If ( numOfLayovers < 1 )
39          Set numOfLayovers = 1;
40      // If at least two layovers are required
41  If ( numOfLayover > 1 )
42  {
43  Set the length of each layover except the last one to be 24
    hours long
44  Set the length of last layover = wait time –
    (numOfLayovers – 1) * 24.0
45      If (the length of last layover < Min Layover Hour)
46      {
47          Set the length of last layover = Min Layover
            Hour
48          // Shrink the length of the second last layover
49          Set the length of the second last layover
50          = wait time – (numOfLayovers – 2) * 24.0 – Min
            Layover Hour
51      }
52  }
53      else // Only one layover is required
54          Set layoverLength = wait time;
55  }
```

APPENDIX D

```
1   Estimated end time
2   = Physical arrival at Facility + Required unload/load
    time
3   If Estimated end time falls on Saturday or Sunday
4   {
5       If scheduled unload/load falls on a weekday
6       {
7           Add weekend layover charge using distance between
8   previous and next stop
9       }
10      Add a weekday layover charge per midnight between
        following
11  Monday morning (after Estimated end time) and scheduled
    unload/load
12  date (if scheduled unload/load occurs after Monday)
13  }
14  else If Estimated end time falls on Friday
15  {
16      If scheduled unload/load falls on Monday or later
17      {
18          If Estimated end time is before close of carrier's
                layover
19  calendar
20          {
21              Add a weekday layover charge
22              Add a weekend layover charge using zero
                distance
23          }
24          else
25          {
26              Add a weekend layover charge using distance between
27  previous and next stop
28          }
29          Add a weekday layover charge per midnight between
                following
30  Monday morning (after Estimated end time) and scheduled
    unload/load
31  date (if scheduled unload/load occurs after Monday)
32  }
33      else
34      {
35          If Estimated end time is before close of
```

APPENDIX D-continued

```
          carrier's layover
36    calendar
37        {
38            Add a weekday layover charge
39        }
40            Add a weekday layover charge per midnight between
41    Saturday morning and scheduled unload/load date (if
      scheduled
42    unload/load occurs after Saturday)
43        }
44    }
45    else
46    {
47        If Estimated end time is before close of carrier's
          layover calendar
48        {
49            Add a weekday layover charge per midnight between
50    Estimated and scheduled unload/load date
51        }
52    }
```

What is claimed is:

1. One or more computer-readable storage media comprising a plurality of software instructions to perform a computer-implemented method of planning movement of freight, the software instructions comprising:

first instructions to automatically insert a plurality of layovers into a proposed mission to be performed by a truck;

wherein prior to execution of the first instructions, said proposed mission comprises a plurality of destinations wherein freight is loaded into or unloaded from said truck, and the proposed mission further comprises a plurality of activities in addition to said layovers;

wherein on execution of the first instructions, a mandatory layover is inserted between a first portion and a second portion of a driving activity in said plurality of activities, said driving activity being divided up into at least said portions automatically on execution of said first instructions when a first predetermined condition is met, the first predetermined condition comprising a maximum number of hours;

wherein the first instructions comprise instructions to check, prior to the driving activity being divided up, whether addition of the driving activity to a window causes said maximum number of hours to be exceeded, the window identifying a group of said activities occurring within a rolling period of a predetermined number of hours up to 7 days, the mandatory layover being of a duration greater than a predetermined minimum number of hours, the duration of the mandatory layover satisfying at least the first predetermined condition;

wherein the first instructions further comprise instructions to advance the window by removing an earliest activity from the group;

wherein the first instructions further comprise instructions to compute, based on at least the duration of the mandatory layover, an estimated time of arrival of said truck at a destination in the plurality of destinations;

wherein the first instructions further comprise instructions to insert a non-mandatory layover into the proposed mission if a second predetermined condition is met, on an unloading activity to be performed at said destination;

second instructions to a processor to automatically determine and store in a memory coupled to the processor, a yet-to-be-incurred new layover charge for the non-mandatory layover depending at least partially on a rule on chargeability of non-mandatory layovers based on: the estimated time of arrival of the truck at the destination, a duration of the unloading activity, and hours of operation of a facility at the destination for performing the unloading activity; and third instructions to prepare and output a plan to move freight to said destination using said truck based at least partially on the yet-to-be-incurred new layover charge and at least one additional cost associated with at least one activity in the plurality of activities.

2. The one or more computer-readable storage media of claim 1 wherein a first counter accumulates hours on duty within a period of said maximum number of hours, a second counter accumulates hours of driving within said period of said maximum number of hours and a third counter accumulates driving distance within said period of said maximum number of hours, the software instructions further comprising:

software instructions to automatically check whether any of the first counter, the second counter and the third counter will exceed a corresponding limit thereon when said driving activity in the mission is performed within said period of said maximum number of hours; and wherein the second portion of the driving activity is sufficient for only one of said counters to just reach its limit.

3. The one or more computer-readable storage media of claim 2 wherein:

the mandatory layover activity is inserted into the mission immediately after the second portion of the driving activity.

4. The one or more computer-readable storage media of claim 1 wherein said second predetermined condition is based on an estimated time of arrival at a destination in the mission.

5. The one or more computer-readable storage media of claim 1 wherein said second predetermined condition comprises any of:

the estimated time of arrival, follows arrival of another mission, by a duration insufficient to unload freight in both missions before close of business at the destination; and the estimated time of arrival is prior to the close of business of the destination but precedes the close of business by a duration insufficient to unload freight carried in the mission; and the estimated time of arrival is after the close of business of the carrier.

6. The one or more computer-readable storage media of claim 1 wherein said first predetermined condition comprises:

hours of driving exceeding a limit set by one of (a government and a carrier).

7. The one or more computer-readable storage media of claim 6 further comprising:

software instructions to automatically use a counter to accumulate total hours of driving to be performed within a period of said maximum number of hours;

software instructions to automatically check whether hours of a driving activity, when added to said counter, will cause said counter to exceed said limit, wherein said driving activity is to be performed between an origin and a destination in said mission;

wherein the second portion of the driving activity is for a number of hours sufficient for said counter to just reach said limit set by government.

8. The one or more computer-readable storage media of claim 7 further comprising:

software instructions to automatically move the period of said maximum number of hours by decrementing the counter, by hours to be spent in an earlier activity already used in incrementing the counter.

9. The one or more computer-readable storage media of claim 8 further comprising:
software instructions to automatically enqueue at the rear of a queue, the driving activity when hours thereof are used to increment the counter; and
software instructions to automatically dequeue from the front of said queue, the earlier activity when hours thereof are used to decrement the counter.

10. The one or more computer-readable storage media of claim 9 wherein:
said queue identifies a plurality of activities to be performed in the mission;
said window is aligned with a front end of said queue; and
said counter represents a sum of hours of all activities related to driving, in said window.

11. The one or more computer-readable storage media of claim 7 further comprising:
software instructions to automatically retrieve from a database, all activities in a mission, by using a database management system; and
software instructions to automatically store the new layover activity in said database.

12. The one or more computer-readable storage media of claim 1 wherein said predetermined condition comprises:
hours of being on duty exceeding a limit set by one of (a government and a carrier).

13. The one or more computer-readable storage media of claim 1 wherein said predetermined condition comprises:
distance being driven exceeding a limit set by one of (a government and a carrier).

14. A computer-implemented apparatus to prepare and output a plan to move freight, the computer-implemented apparatus comprising:
means for automatically inserting a plurality of layovers into a proposed mission to be performed by a truck;
wherein said proposed mission comprises a plurality of destinations at which freight is loaded into or unloaded from said truck, and the proposed mission further comprises a plurality of activities in addition to said layovers;
wherein a mandatory layover is inserted, by said means for automatically inserting, between a first portion and a second portion of a driving activity in said plurality of activities, said driving activity being divided up into at least said portions automatically on execution of said first instructions when a first predetermined condition is met, the first predetermined condition comprising a maximum number of hours;
wherein said means for automatically inserting checks prior to the driving activity being divided up, whether addition of the driving activity to a window causes said maximum number of hours to be exceeded, the window identifying a group of said activities occurring within a rolling period of a predetermined number of hours up to 7 days, the mandatory layover being of a duration greater than a predetermined minimum number of hours, the duration of the mandatory layover satisfying at least the first predetermined condition;
wherein said means for automatically inserting advances the window by removing an earliest activity from the group;
wherein said means for automatically inserting computes, based on at least the duration of the mandatory layover, an estimated time of arrival of said truck at a destination in the plurality of destinations;
wherein said means for automatically inserting further inserts a non-mandatory layover into the proposed mission if a second predetermined condition is met, on an unloading activity to be performed at said destination;
means for automatically determining and storing in a computer memory, a yet-to-be-incurred new layover charge for the non-mandatory layover, depending at least partially on rule on chargeability of non-mandatory layovers based on: the estimated time of arrival of the truck at the destination, a duration of the unloading activity, and hours of operation of a facility at the destination for performing the unloading activity.

15. The computer-implemented apparatus of claim 14 wherein said means for adding comprises:
means for incrementing a counter by a number of hours to be spent in the driving activity in said mission, unless hours for the driving activity will cause the counter to exceed a limit;
means for adding hours to be spent in the first portion of the activity, to the counter, thereby to increase the counter up to the limit;
means for decrementing the counter, by hours to be spent by an earlier activity that has been already used in incrementing the counter;
wherein the means for dividing is coupled to the means for incrementing to provide thereto the second portion of the activity as the driving activity in said mission.

16. A computer-implemented method of planning movement of freight by using transportation planning software, the computer-implemented method comprising:
automatically inserting a plurality of layovers into a proposed mission to be performed by a truck,
wherein said proposed mission comprises a plurality of destinations wherein freight is loaded into or unloaded from said truck, and the proposed mission further comprises a plurality of activities in addition to said layovers;
wherein on performance of said automatically inserting, a mandatory layover is inserted between a first portion and a second portion of a driving activity in said plurality of activities, said driving activity being divided up into at least said portions automatically on execution of said first instructions when a first predetermined condition is met, the first predetermined condition comprising a maximum number of hours;
wherein said automatically inserting comprises, prior to the driving activity being divided up, checking whether addition of the driving activity to a window causes said maximum number of hours to be exceeded, the window identifying a group of said activities occurring within a rolling period of a predetermined number of hours up to 7 days, the mandatory layover being of a duration greater than a predetermined minimum number of hours, the duration of the mandatory layover satisfying at least the first predetermined condition;
wherein said automatically inserting comprises advancing the window by removing an earliest activity from the group;
wherein said automatically inserting comprises, computing based on at least the duration of the mandatory layover, an estimated time of arrival of said truck at a destination in the plurality of destinations;
wherein said automatically inserting comprises further inserting a non-mandatory layover into the proposed mission if a second predetermined condition is met, on an unloading activity to be performed at said destination; and using a processor to automatically determine and store in a memory coupled to the processor, a yet-to-be-incurred new layover charge, depending at least partially on a rule on chargeability of non-mandatory layovers based on: the estimated time of arrival of the truck at the destination, a duration of the unloading activity, and hours of operation of a facility at the destination for performing the unloading activity.

17. The method of claim 16 wherein said first predetermined condition comprises any one of (hours on duty, hours of driving, and driving distance) exceeding a corresponding limit set by one of (a government and a carrier).

18. The method of claim 16 wherein a first counter accumulates hours on duty within a period of said maximum number of hours, a second counter accumulates hours of driving within said period of said maximum number of hours and a third counter accumulates driving distance within said period of said maximum number of hours, and wherein said automatically inserting comprises:

automatically checking whether any of the first counter, the second counter and the third counter will exceed a corresponding limit thereon when a driving activity in the mission is performed within said period of said maximum number of hours; and wherein the second portion of the driving activity is sufficient for only one of said counters to just reach its limit.

19. The method of claim 16 wherein said automatically inserting comprises:

automatically using a counter to accumulate total hours of driving to be performed within a period of said maximum number of hours;

automatically checking whether hours of a driving activity, when added to said counter, will cause said counter to exceed said limit, wherein said driving activity is to be performed between an origin and a destination in said mission; and wherein the second portion of the driving activity is for a number of hours sufficient for said counter to just reach said limit set by government.

20. The method of claim 19 wherein said automatically inserting comprises:

automatically moving the period of said maximum number of hours by decrementing the counter, by hours to be spent in said proposed mission, in an earlier activity already used in incrementing the counter.

* * * * *

UNITED STATES PATENT AND TRADEMARK OFFICE
CERTIFICATE OF CORRECTION

PATENT NO. : 7,827,051 B2  
APPLICATION NO. : 11/136167  
DATED : November 2, 2010  
INVENTOR(S) : Javier Nicolas Sanchez et al.

Page 1 of 1

It is certified that error appears in the above-identified patent and that said Letters Patent is hereby corrected as shown below:

In column 15, line 18, delete "FIG. 4i" and insert -- FIG. 4I --, therefor.

In column 18, line 16, delete "500" and insert -- 500, --, therefor.

In column 26, line 34, in claim 16, delete "truck," and insert -- truck; --, therefor.

Signed and Sealed this  
Second Day of August, 2011

David J. Kappos  
*Director of the United States Patent and Trademark Office*